(12) United States Patent
Umemoto et al.

(10) Patent No.: US 6,747,801 B2
(45) Date of Patent: Jun. 8, 2004

(54) OPTICAL FILM AND LIQUID-CRYSTAL DISPLAY DEVICE

(75) Inventors: Seiji Umemoto, Osaka (JP); Toshihiko Ariyoshi, Osaka (JP); Takao Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/758,165

(22) Filed: Jan. 12, 2001

(65) Prior Publication Data

US 2001/0053029 A1 Dec. 20, 2001

(30) Foreign Application Priority Data

| Jan. 13, 2000 | (JP) | ........................................ | 2000-004241 |
| Jan. 31, 2000 | (JP) | ........................................ | 2000-021309 |
| Mar. 27, 2000 | (JP) | ........................................ | 2000-085718 |

(51) Int. Cl.⁷ ............................. G02B 13/20; F21V 7/04
(52) U.S. Cl. ..................... 359/599; 359/613; 359/831; 349/57; 362/31
(58) Field of Search ............................. 359/599, 707, 359/613, 431, 831–837; 349/57–64; 362/31

(56) References Cited

U.S. PATENT DOCUMENTS

| 5,183,597 | A |   | 2/1993  | Lu ........................ 264/1.4 |
| 5,341,231 | A |   | 8/1994  | Yamamoto et al. .......... 349/64 |
| 5,390,276 | A | * | 2/1995  | Tai et al. ..................... 385/146 |
| 5,461,547 | A | * | 10/1995 | Ciupke et al. ................. 362/31 |
| 5,485,291 | A | * | 1/1996  | Qiao et al. .................... 349/64 |
| 5,584,556 | A |   | 12/1996 | Yokoyama et al. ............ 362/31 |
| 5,598,281 | A |   | 1/1997  | Zimmerman et al. .......... 349/5 |
| 5,671,994 | A |   | 9/1997  | Tai et al. ..................... 362/31 |
| 5,712,694 | A |   | 1/1998  | Taira et al. .................... 349/9 |
| 5,727,107 | A |   | 3/1998  | Umemoto et al. ........... 385/116 |
| 5,808,713 | A |   | 9/1998  | Broer et al. .................... 349/98 |
| 5,897,184 | A |   | 4/1999  | Eichenlaub et al. |

(List continued on next page.)

FOREIGN PATENT DOCUMENTS

| EP | 867 747 | * | 9/1998 |
| JP | 5-158033 |   | 6/1993 |
| JP | 09-297222 |   | 11/1997 |
| JP | 10-106328 |   | 4/1998 |
| JP | 11-142618 | * | 5/1999 |
| JP | 2000-147499 |   | 5/2000 |
| WO | WO 97/01610 |   | 1/1997 |
| WO | WO 97/30373 |   | 8/1997 |
| WO | WO 97/47467 |   | 12/1997 |

OTHER PUBLICATIONS

Patent Abstract of Japan, 05–158033, Jun. 25, 1993.

*Primary Examiner*—Thong Q. Nguyen
(74) *Attorney, Agent, or Firm*—Sughrue Mion, PLLC

(57) ABSTRACT

An optical film has a transparent film, an adhesive layer provided on one surface of the transparent film, the adhesive layer having a refractive index different by 0.1 or less from that of a layer of the one surface of the transparent film, and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film. Another optical film has a transparent film having an average in-plane retardation of not larger than 30 nm, an adhesive layer provided on one surface of the transparent film, the adhesive layer having a refractive index different by 0.12 or less from that of a layer of the one surface of the transparent film, and the repetitive prismatic structure provided on the other surface of the transparent film. Still another optical film has a transparent film having a refractive index of not lower than 1.49, a transparent adhesive layer provided on one surface of the transparent film, the transparent adhesive means having a refractive index of not lower than 1.49, and the repetitive prismatic structure provided on the other surface of the transparent film.

13 Claims, 6 Drawing Sheets

U.S. PATENT DOCUMENTS

| | | | |
|---|---|---|---|
| 5,945,209 A | 8/1999 | Okazaki et al. | 428/304.4 |
| 5,961,198 A | 10/1999 | Hira et al. | 362/31 |
| 5,999,685 A * | 12/1999 | Goto et al. | 385/146 |
| 6,044,196 A | 3/2000 | Winston et al. | 385/145 |
| 6,060,183 A | 5/2000 | Higashi et al. | 428/70 |
| 6,068,382 A * | 5/2000 | Fukui et al. | 362/31 |
| 6,091,469 A | 7/2000 | Naito | 349/113 |
| 6,147,732 A | 11/2000 | Aoyama et al. | 349/112 |
| 6,196,692 B1 | 3/2001 | Umemoto et al. | 362/31 |
| 6,236,439 B1 | 5/2001 | Saiki et al. | 349/117 |
| 6,266,108 B1 | 7/2001 | Bao et al. | 349/63 |
| 6,285,426 B1 | 9/2001 | Akins et al. | 349/114 |
| 6,322,236 B1 | 11/2001 | Campbell et al. | 362/333 |
| 6,369,950 B1 | 4/2002 | Umemoto | 359/628 |
| 6,384,881 B1 | 5/2002 | Arai et al. | 349/65 |
| 2001/0009474 A1 | 7/2001 | Umemoto et al. | 359/485 |
| 2001/0010630 A1 | 8/2001 | Umemoto et al. | 362/31 |
| 2001/0011779 A1 | 8/2001 | Stover | 264/1.7 |
| 2001/0012158 A1 | 8/2001 | Umemoto et al. | 359/599 |
| 2001/0012159 A1 | 8/2001 | Umemoto et al. | 359/599 |

* cited by examiner

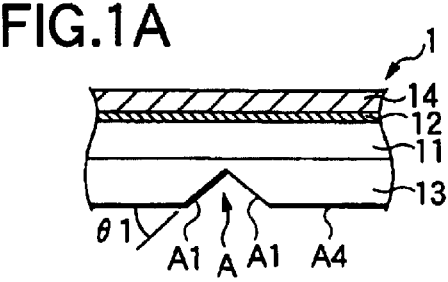
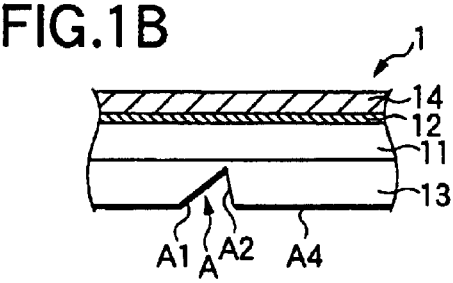
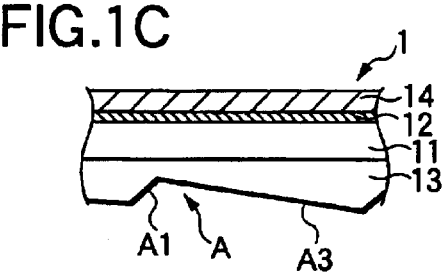
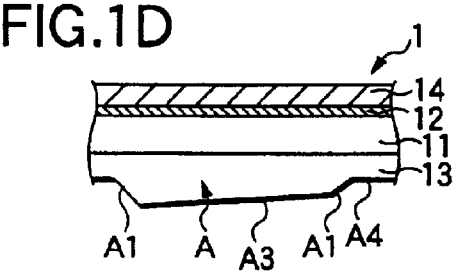
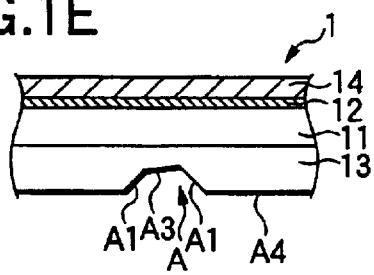
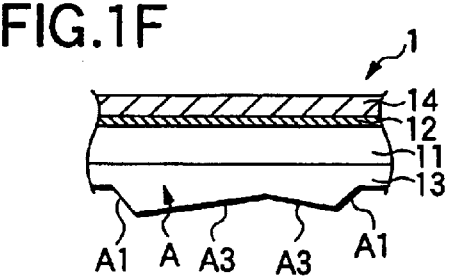
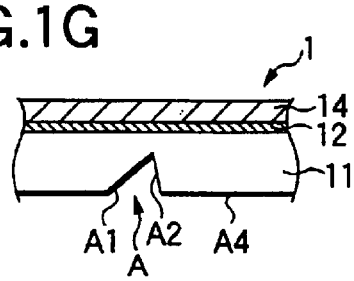
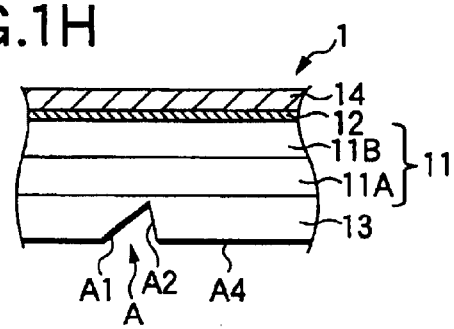
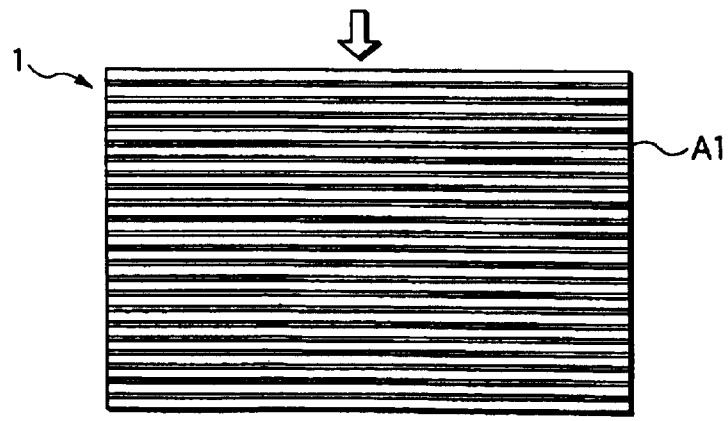

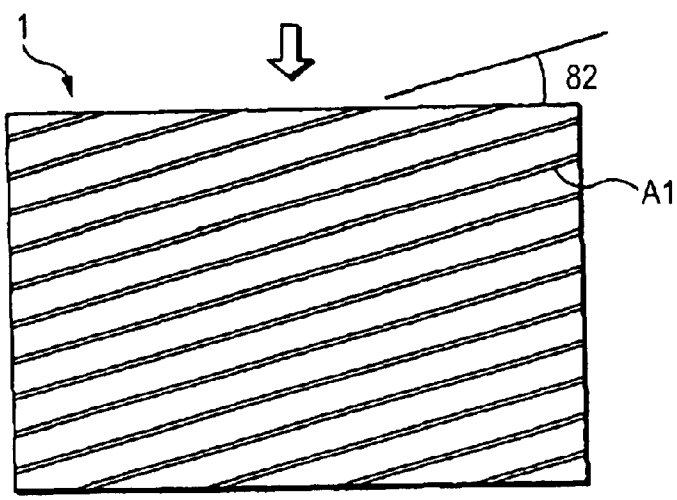
FIG. 3
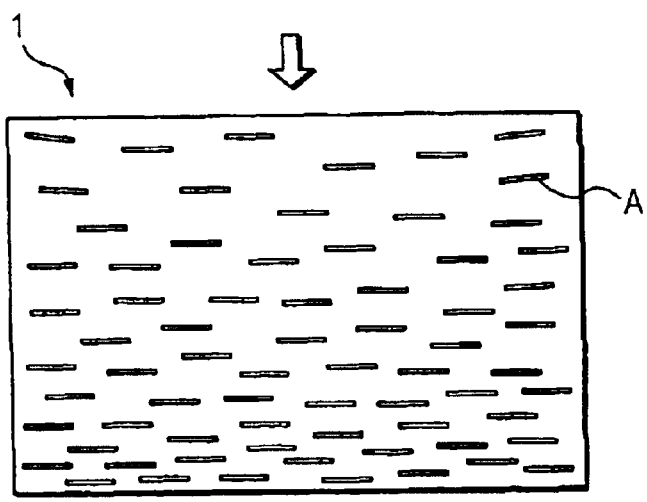
FIG. 4
FIG. 5
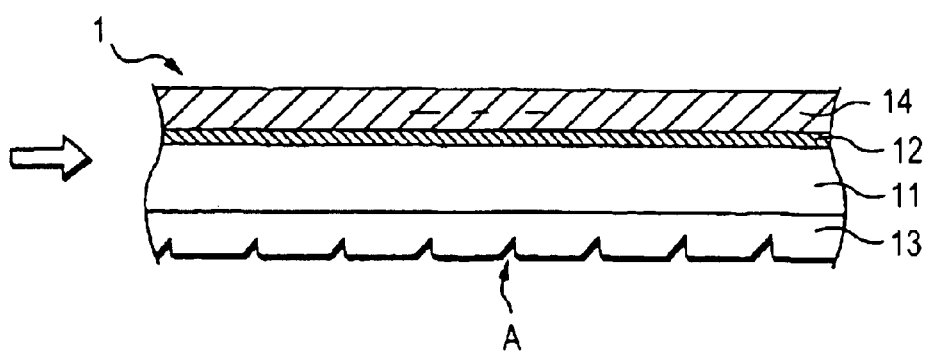

OPTICAL FILM AND LIQUID-CRYSTAL DISPLAY DEVICE

BACKGROUND OF THE INVENTION

1. Field of the Invention

The present invention relates to an optical film by which the optical path of the light incident on one of side surfaces of a liquid-crystal display device is changed to a viewing direction efficiently, and with which it is possible to form a transmission type or reflection-transmission double type liquid-crystal display device which is small in thickness, which is light in weight, which is excellent in brightness and uniformity of brightness and display of which is easy to view.

The present application is based on Japanese Patent Applications No. 2000-4241, 2000-21309 and 2000-85718, which are incorporated herein by reference.

2. Description of the Related Art

Greater reduction in thickness, size and weight of transmission type liquid-crystal display devices has been demanded for purposes of suppression of increase in weight which is accompanied by increase in size of television and personal computer display screens, reduction in size and weight of portable personal computers and portable telephone sets, etc. In the meanwhile, it is difficult to reduce thickness, size and weight of a transmission type liquid-crystal display device provided with a back-lighting system using a background-art bottom type or side-lighting type light pipe. Incidentally, the bottom-type back-lighting system generally has a thickness of not smaller than 4 mm because an illuminator, a light diffusing plate and a reflector are disposed just under a liquid-crystal display panel. Even the side-lighting type light pipe has a thickness of not smaller than 1 mm under the necessity of light transmission. When a light diffusing plate, a reflector, a prism sheet, etc. are disposed on the side-lighting type light pipe, the total thickness generally reaches a value of not smaller than 3 mm.

A liquid-crystal display device in which a half-transmission type reflector is disposed between the aforementioned transmission type liquid-crystal display panel and a back-lighting system is heretofore known as a reflection-transmission double type liquid-crystal display device which can be viewed in a reflection mode by using external light. The half-transmission type reflector is disposed in order to make viewing in a reflection mode possible. If there is no half-transmission type reflector, viewing in a reflection mode by using external light is so dark that the liquid-crystal display device substantially hardly functions as a reflection type liquid-crystal display device. The addition of the half-transmission type reflector, however, makes the volume and weight of the liquid-crystal display device larger. Moreover, light is diverged into transmitted light and reflected light by the half-transmission type reflector. There is therefore a problem that not only viewing in a transmission mode but also viewing in a reflection mode becomes dark so that brightness in a reflection mode is inferior to that of a reflection exclusive type liquid-crystal display device using a high-reflectance reflection layer.

SUMMARY OF THE INVENTION

An object of the present invention is to develop an optical film by which the optical path of the light incident on one of side surfaces of a liquid-crystal display device is changed to a viewing direction efficiently, and with which it is possible to form a transmission type or reflection-transmission double type liquid-crystal display device which is small in thickness, which is light in weight, and display of which is bright and easy to view.

According to a first aspect of the present invention, there is provided an optical film comprising: a transparent film; an adhesive layer provided on one surface of the transparent film, the adhesive layer having a refractive index different by 0.1 or less from a refractive index of a layer of the one surface of the transparent film; and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film.

According to a second aspect of the present invention, there is also provided an optical film comprising: a transparent film having an average in-plane retardation of not larger than 30 nm; an adhesive layer provided on one surface of the transparent film, the adhesive layer having a refractive index different by 0.12 or less from a refractive index of a layer of the one surface of the transparent film; and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film.

According to a third aspect of the present invention, there is also provided an optical film comprising: a transparent film having a refractive index of not lower than 1.49; transparent adhesive means provided on one surface of the transparent film, the transparent adhesive means having a refractive index of not lower than 1.49; and a repetitive prismatic structure provided on the other surface of the transparent film, the repetitive prismatic structure of having optical path changing slopes aligned in a substantially constant direction at an inclination angle in a range of from 35 to 48 degrees with respect to a plane of the transparent film. There is further provided a liquid-crystal display using the optical film.

The optical film according to the present invention is disposed along the viewing surface of a liquid-crystal display panel having an illuminator on one of side surfaces of the panel. Hence, the optical path of the light incident on the side surface or the transmission light of the incident light is changed efficiently to the viewing direction of the liquid-crystal display panel by optical path changing slopes disposed on the optical film. Hence, the light can be utilized for liquid-crystal display in a transmission mode. Hence, it is possible to form a transmission type liquid-crystal display device which is small in thickness and light in weight, which is excellent in brightness and uniformity of brightness, which is low in display unevenness and which is excellent in display quality. Moreover, because flat surface portions are disposed between the optical path changing slopes in the optical film, external light can be made to enter efficiently through the flat surface portions. Hence, when the entering external light is reflected by the reflection layer, the external light can be utilized for liquid-crystal display in a reflection mode. A reflection mode system can be formed as well as the aforementioned transmission mode system. Hence, it is possible to form a transmission-reflection double type liquid-crystal display device which is small in thickness and light in weight, which is excellent in brightness and uniformity of brightness, which is low in display unevenness and which is excellent in display quality.

The aforementioned effect is produced by an optical path control type optical film which mainly uses slope reflection to control the optical path of light. That is, the light incident on one of side surfaces of the liquid-crystal display panel or the transmission light of the incident light is reflected by optical path changing slopes so that the optical path of the light can be changed with good directivity. Hence, good visibility in a transmission mode can be achieved. Moreover, flat surfaces can be disposed easily between the optical path changing slopes. Hence, external light is transmitted through the flat surfaces so that entering of external light can be ensured sufficient. Hence, good visibility in a reflection mode can be also achieved. In a method of scatter reflection by a roughened surface of a scattering sheet 6 shown in FIG. 14, or the like, it is difficult to achieve the aforementioned effect. Incidentally, JP-A-5-158033 discloses a reflection type liquid-crystal display device in which illumination light is made incident on one of side surfaces of a liquid-crystal display panel and totally reflected by a visual side cell substrate and in which the reflected light is scattered by a roughened surface type reflector so that the scattered light is utilized for display.

In the aforementioned case, however, light allowed to be utilized for display is that which exits from the panel due to coming contrary to the total reflection condition by scattering. Generally, scattered light exhibits a normal distribution having a direction of regular reflection as a peak, in Extended Abstracts (the 20th Liquid-Crystal Discussion Lecture) 3 G510, Tohoku University; Uchida et al. Hence, the aforementioned display light is the light hardly utilized efficiently for display and greatly inclined with respect to a frontal (vertical) direction. Hence, the display becomes dark in the frontal direction. Nevertheless, intensifying scattering by the roughened surface type reflector is unfavorable for display in consideration of viewing in a reflection mode because the quantity of light in the frontal direction in the reflection mode is reduced (SID 96 DIGEST pp. 149–152). In the roughened surface scatter reflection method, it is, therefore, difficult to obtain scattering intensity favorable to the two modes because scattering intensity required of the transmission mode is antinomic to scattering intensity required of the reflection mode.

On the other hand, according to the present invention, the optical path control type optical film, which uses slope reflection to control the optical path of light, mainly utilizes light exhibiting a peak in a direction of regular reflection and controls the optical path of the reflected light. Hence, directivity, especially frontal directivity, favorable for display can be provided easily. Hence, a bright transmission mode can be achieved. Also in a reflection mode, flat portions of the optical film except the optical path changing slopes can be utilized, and efficient entrance, reflection and transmission of external light can be ensured. Hence, the state of light can be balanced easily so as to be favorable to both reflection and transmission modes. Further, according to the present invention, the optical film is designed to be able to be bonded to a glass substrate, or the like, of a liquid-crystal cell through adhesive means having a large refractive index. Hence, as indicated by the arrows in FIG. 7, the total reflection on the bonding interfaces can be reduced in the optical film to thereby make it possible to form a transmission type or reflection-transmission double type liquid-crystal display device which is excellent in brightness and uniformity of brightness, which is low in display unevenness and which is excellent in display quality. If the total reflection were great in the optical film, the quantity of light which is incident on one of side surfaces of the cell and which is transmitted through the cell from the side surface so as to enter the optical film would be reduced. Particularly, transmission light which is more approximately parallel with the cell substrate as indicated by the arrow in FIG. 10 would cause total reflection more easily. That is, light which is transmitted to a position farther from the incidence side surface would cause total reflection more easily. As a result, brightness in a position far from the incidence side surface would be reduced to increase variation in brightness. Hence, display quality of the display device would be lowered.

Features and advantages of the invention will be evident from the following detailed description of the preferred embodiments described in conjunction with the attached drawings.

BRIEF DESCRIPTION OF THE DRAWINGS

In the accompanying drawings:

FIGS. 1A to 1H are explanatory side views showing examples of an optical film (optical path changing slopes);

FIG. 2 is a plan view showing an example of optical path changing slopes;

FIG. 3 is a plan view showing another example of the optical path changing slopes;

FIG. 4 is a plan view showing a further example of the optical path changing slopes;

FIG. 5 is a side view showing another example of the optical film;

DETAILED DESCRIPTION OF THE PREFERRED EMBODIMENTS

Figure 6:
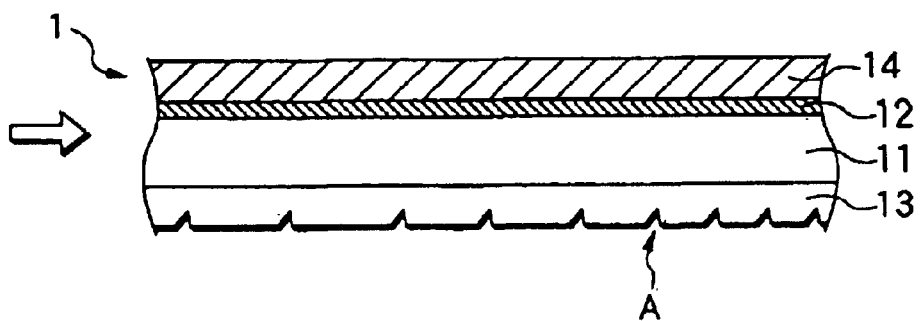
FIG. 6 is a side view showing a further example of the optical film.

The optical film according to the present invention comprises: a transparent film; an adhesive layer provided on one surface of the transparent film, the adhesive layer having a refractive index different by 0.1 or less from that of a layer of the one surface of the transparent film; and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film.

The optical film from another aspect of the present invention comprises: a transparent film having an average in-plane retardation of not larger than 30 nm; an adhesive layer provided on one surface of the transparent film, the adhesive layer having a refractive index different by 0.12 or less from are fractive index of a layer of the one surface of the transparent film; and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film.

The optical film from still another aspect of the present invention comprises: a transparent film having a refractive index of not lower than 1.49; transparent adhesive means provided on one surface of the transparent film, the transparent adhesive means having a refractive index of not lower than 1.49; and a repetitive prismatic structure provided on the other surface of the transparent film, the repetitive prismatic structure having optical path changing slopes aligned in a substantially constant direction at an inclination angle in a range of from 35 to 48 degrees with respect to a plane of the transparent film.

FIGS. 1A to 1H show examples of the optical film. The reference numeral 1 designates an optical film; 11, a transparent film; 12, adhesive means; 13, a layer of a repetitive prismatic structure, that is, a layer of a repetitive structure of a plurality of optical path changing means A having optical path changing slopes Al; and 14, a strip sheet. The repetitive structure of the plurality of optical path changing means A may be formed integrated with the transparent film 11, as illustrated in FIG. 1G.

Figure 7:
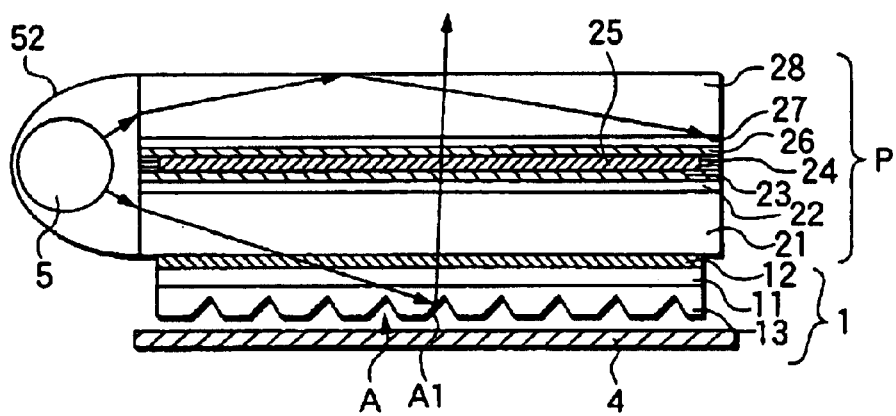
FIG. 7 is a sectional view showing an example of a liquid-crystal display device (an explanatory view of a relationship between a refractive index and an optical path)

As illustrated in FIG. 7, the optical film 1 is disposed along a viewing surface of a liquid-crystal display panel P having an illuminator 5 on one of its side surfaces. That is, the light incident on the side surface from the illuminator 5 or the transmission light of the incident light is reflected by the optical path changing slopes Al as indicated by the arrow in FIG. 7. The optical path of the reflected light is changed toward a non-slope-forming surface of the transparent film 11, that is, toward the viewing direction of the liquid-crystal display panel P, so that the light is made to exit from the transparent film 11. The optical film 1 is provided for the purpose of being capable of utilizing the exit light as illumination light (display light) for the liquid-crystal display panel, etc.

The transparent film having a refractive index of not lower than 1.49 can be formed of a suitable material exhibiting transparency and corresponding to the wavelength range of light which is made to enter the film from the illuminator, or the like. Incidentally, examples of the suitable material used in a visible light range include: transparent resin represented by acrylic resin, polycarbonate resin, cellulose resin, norbornene resin, or the like; curable resin which can be polymerized by heat, by ultraviolet rays, or by radial rays such as electron rays; and so on. From the point of view to enhance the efficiency of incidence of the light incident on the optical path changing slopes to thereby obtain a liquid-crystal display device excellent in brightness and uniformity of brightness, the refractive index of the transparent film is preferably not lower than 1.50, more preferably not lower than 1.51, further preferably not lower than 1.52. Although such are fractive index is generally based on a D line in the case of the visible light range, it is not limited to the above values but may be set in accordance with the wavelength range of the incident light if the incident light has peculiarity with respect to the wavelength range (the same rule is applied hereinafter).

From the point of view to restrain luminance unevenness or color shading to obtain a liquid-crystal display device low in display unevenness, it is preferable that the transparent film exhibits no birefringence or small birefringence, and particularly has an average in-plane retardation of not larger than 30 mm. When the transparent film is made to have a small retardation, and linearly polarized light enters through a polarizer, or the like, the polarized state of the light can be kept satisfactory advantageously to prevention of the display quality from being deteriorated.

Figure 11:
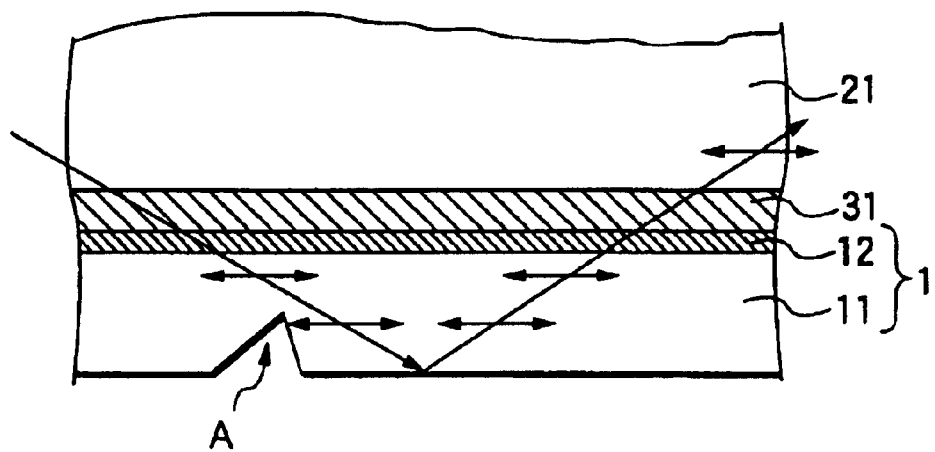
FIG. 11 is a view showing a transmission state of polarized light.
Figure 12:
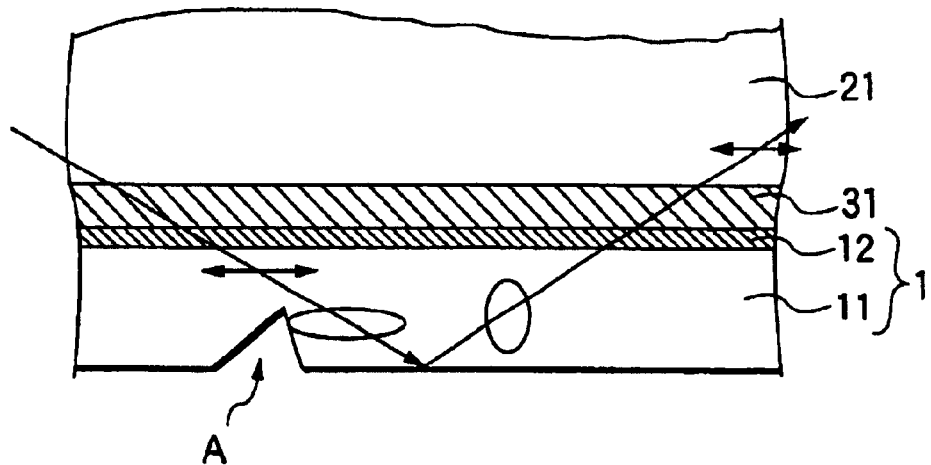
FIG. 12 is a view showing another transmission state of polarized light.

That is, when the transparent film 11 having a small retardation as illustrated in FIG. 11 is used in the case where linearly polarized light enters the transparent film 11 through a polarizer 31, or the like, the polarized state of the light can be kept excellent so that the display quality can be prevented from being deteriorated. Incidentally, a polyester film, or the like, however, generally exhibits a retardation of about 2,000 nm. If the film having a large retardation as illustrated in FIG. 12 is used in the case where linearly polarized light enters the film through the polarizer 31, or the like, the light may be iridized due to a color shift in accordance with its incident angle or reflection angle under the influence of the retardation, or the polarized state may be changed to lower the transmission efficiency or exit efficiency of the light. As a result, display unevenness such as luminance unevenness or color shading is apt to appear undesirably. From the point of view to prevent display unevenness, the average in-plane retardation of the transparent film is preferably not larger than 20 nm, more preferably not larger than 15 nm, further preferably not larger than 10 nm, and it is also preferable that the retardation in the transparent film from place to place varies as small as possible. Further, if it is necessary to restrain internal stress, which is easily produced in the transparent film in the bonding process, so as to prevent a retardation from being produced due to the internal stress, the transparent film is preferably made of a material having a low photoelastic coefficient.

In addition, in consideration that the incidence angle of transmission light onto the transparent film is apt to exceed 45 degrees, the average thicknesswise retardation of the transparent film is apt to have an influence on the incidence angle in the same manner as that in the average in-plane retardation. Therefore, the average thicknesswise retardation is preferably not larger than 50 nm, more preferably not larger than 30 nm, further preferably not larger than 20 nm, from the point of view to prevent display unevenness. The transparent film with such a small retardation may be formed by a suitable method, for example, by a method in which internal optical strain is eliminated by an existing means for annealing a film. Casting is a preferable method to form a transparent film with such a small retardation. Incidentally, the aforementioned retardation conditions concerning the transparent film does not have to be satisfied all over the whole surface of the optical film. It will go well if the retardation conditions are satisfied in a display-available extent of the optical film. In addition, it is preferable that the retardation is based on light in a visible range, particularly based on light of a wavelength of 550 nm.

To achieve the aforementioned purpose, the transparent film 11 is provided with slopes Al as shown in FIGS. 1A to 1H. The slopes Al are provided on one side of the transparent film 11, and reflect the incident light on one of side surfaces or the transmission light of the incident light to thereby change the optical path of the light. On this occasion, from the point of view of obtaining illumination light excellent in frontal directivity through optical path change, the transparent film 11 is configured as shown in FIGS. 1A to 1H. That is, according to the present invention, the transparent film 11 is formed to have a repetitive prismatic structure, that is, a repetitive structure of a plurality of optical path changing means A containing optical path changing slopes A1 aligned in an approximately constant direction so as to be inclined at an inclination angle θ1 in a range of from 35 to 48 degrees with respect to the film plane.

FIGS. 1A to 1H show various examples of each of the plurality of optical path changing means A having optical path changing slopes A1. In FIGS. 1A to 1C, and FIGS. 1G and 1H, each of the optical path changing means A is substantially shaped like a triangle in section. In FIGS. 1D and 1E, each of the optical path changing means A is substantially shaped like a tetragon in section. In FIG. 1F, each of the optical path changing means A is substantially shaped like a pentagon in section. More specifically, in FIG. 1A, each of the optical path changing means A has two optical path changing slopes A1 and is shaped like an isosceles triangle in section. In FIGS. 1B, 1G and 1H, each of the optical path changing means A has an optical path changing slope A1, and a steep slope A2 having an inclination angle larger than that of the slope A1. In FIG. 1C, the optical path changing means A are provided as a repetitive structure of optical path changing means A each having a combination of an optical path changing slope A1 and a gentle slope A3 having an inclination angle smaller than that of the slope A1. In FIG. 1C, the optical path changing means A are formed over the whole surface of one side of the transparent film 11 so that they are adjacently continued to one another. In FIGS. 1A to 1C and FIGS. 1E, 1G and 1H, the plurality of optical path changing means A are constituted by concave portions (grooves). In FIGS. 1D and 1F, the plurality of optical path changing means A are constituted by convex portions (protrusions).

Hence, the optical path changing means may be formed from concave or convex portions constituted by equal-side surfaces or slopes having equal inclination angles as described above. Alternatively, the optical path changing means may be formed from concave or convex portions constituted by a combination of optical path changing slopes and steep or gentle slopes, or slopes different in inclination angle. The shape of the optical path changing means can be determined suitably corresponding to the number of incidence side surfaces and the position of each incidence side surface on which the light is incident. From the point of view of improving mar-proofness to keep the slope function high, a plurality of optical path changing means constituted by concave portions are superior to a plurality of optical path changing means constituted by convex portions because the slopes, etc., in the concave portions are hardly damaged.

The optical film preferable from the point of view of achieving the aforementioned characteristic such as frontal directivity has optical path changing slopes A1 which are aligned in a substantially constant direction so as to face the incidence side surface on which the light is incident. Hence, when light is made incident on two or more side surfaces of the optical film 1, for example, as shown in FIG. 9, it is preferable to use an optical film having optical path changing slopes A1 corresponding to the number and positions of the incidence side surfaces.

Figure 9:
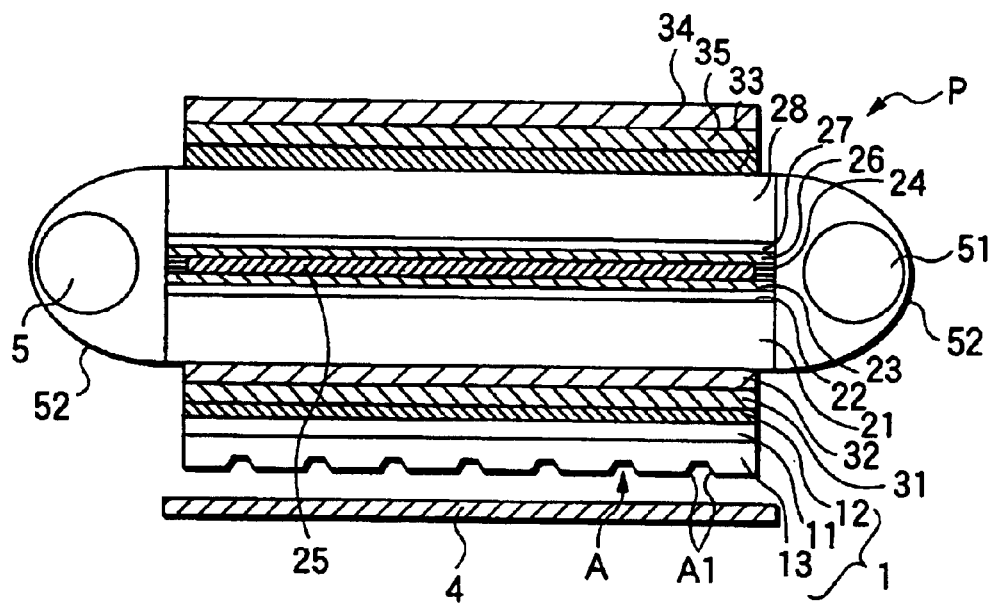
FIG. 9 is a sectional view showing a further example of the liquid-crystal display device.
Figure 10:
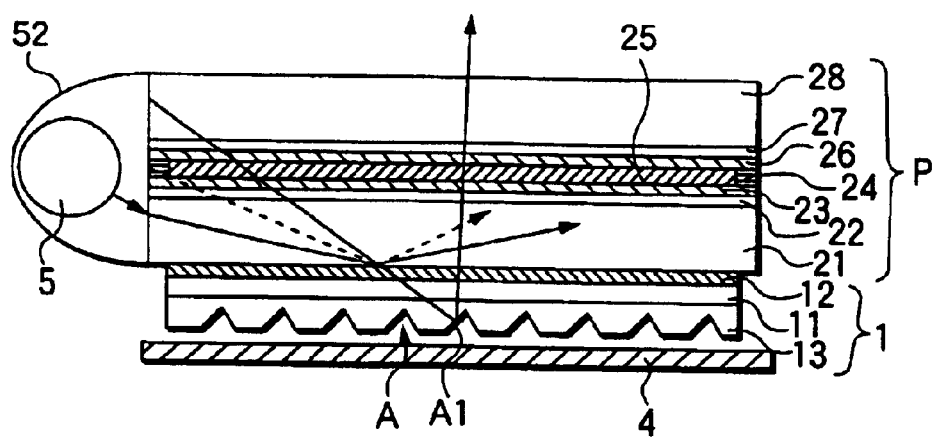
FIG. 10 is a view of another relationship between a refractive index and an optical path.

Incidentally, when opposite two side surfaces of the optical film 1 are used as incidence side surfaces on which the light is incident as shown in FIG. 9, there is preferably used an optical film 1 constituted by a plurality of optical path changing means containing two or more kinds of optical path changing slopes. Among the two or more kinds of optical path changing slopes, one kind of optical path changing slopes aligned in an approximately constant direction serve as a reference while another kind of optical path changing slopes are aligned in a direction opposite to the reference optical path changing slope. Examples of the optical film preferably used include: an optical film 1 constituted by a plurality of optical path changing means A each of which is shaped like an isosceles triangle in section by two optical path changing slopes A1 as shown in FIG. 1A; and an optical film 1 constituted by a plurality of optical path changing means A each of which contains two optical path changing slopes A1 and each of which is substantially shaped like a trapezoid, a tetragon or a pentagon in section as shown in FIGS. 1D, 1E and 1F so that the ridge lines each of which includes two optical changing slopes A1 are parallel to the incidence side surfaces respectively.

When two adjacent cross side surfaces of the optical film are used as incidence side surfaces on which the light is incident, there is preferably used an optical film having two kinds of optical path changing slopes A1 corresponding to the incidence side surfaces so that the ridgelines of the two kinds of optical path changing slopes A1 are parallel to the two cross side surfaces respectively. When three or more side surfaces inclusive of opposite side surfaces and adjacent cross side surfaces are used as incidence side surfaces on which the light is incident, there is preferably used an optical film having optical path changing slopes A1 constituted by a combination of the aforementioned slopes.

As described above, the optical path changing slopes A1 play a role of reflecting the light incident on the slopes A1, among the light incident on the incidence side surface and the transmission light of the incident light, to thereby change the optical path of the light. In this case, when the inclination angle θ1 of each of the optical path changing slopes A1 with respect to the film plane is selected to be in a range of from 35 to 48 degrees as illustrated in FIG. 1A, the optical path of the light incident on the side surface or the transmission light of the incident light can be changed so as to be sufficiently perpendicular to the film plane. Accordingly, illumination light excellent in frontal directivity can be obtained efficiently.

If the inclination angle θ1 is smaller than 35 degrees, the optical path of the reflected light is largely shifted by 30 degrees or more from the frontal direction. Accordingly, the reflected light is difficult to be utilized effectively for display, and frontal luminance may therefore run short. On the other hand, if the inclination angle θ1 is larger than 48 degrees, the condition for total reflection of the light incident on the incidence side surface or the transmission light of the incident light cannot be satisfied. Accordingly, light leaking from the optical path changing slopes increases, and efficiency of utilization of the light incident on the side surface may therefore run short. From the point of view of optical path change excellent in frontal directivity, suppression of leaking light, etc., and in consideration of the condition for total reflection of the transmission light on the basis of refraction in Snell's law, the inclination angle θ1 of each of the optical path changing slopes A1 is preferably in a range of from 38 to 45 degrees, more preferably in a range of from 40 to 44 degrees.

The plurality of optical path changing means A having the optical path changing slopes A1 are formed as a repetitive prismatic structure for the purpose of reducing the thickness of the optical film. In this case, it is necessary to reflect the light incident on the incidence side surface and transmit the reflected light toward the counter side surface efficiently so as to emit light on the whole surface of the optical film as uniformly as possible. From this point of view, it is preferable that the optical path changing means A are formed as a structure including flat surfaces which are constituted by gentle slopes A3 inclined at an inclination angle of not larger than 5 degrees, particularly not larger than 4 degrees, more particularly not larger than 3 degrees with respect to the film plane, or which are constituted by film surfaces A4 inclined at an inclination angle of about 0 degree with respect to the film plane as shown in FIGS. 1A to 1H. Therefore, the optical path changing means A including steep slopes A2 as illustrated in FIGS. 1B, 1G and 1H are preferably formed as a structure in which the angle of the steep slopes A2 is selected to be not smaller than 35 degrees, particularly not smaller than 50 degrees, more particularly not smaller than 60 degrees so that the width of the film surfaces A4 can be enlarged.

Figure 8:
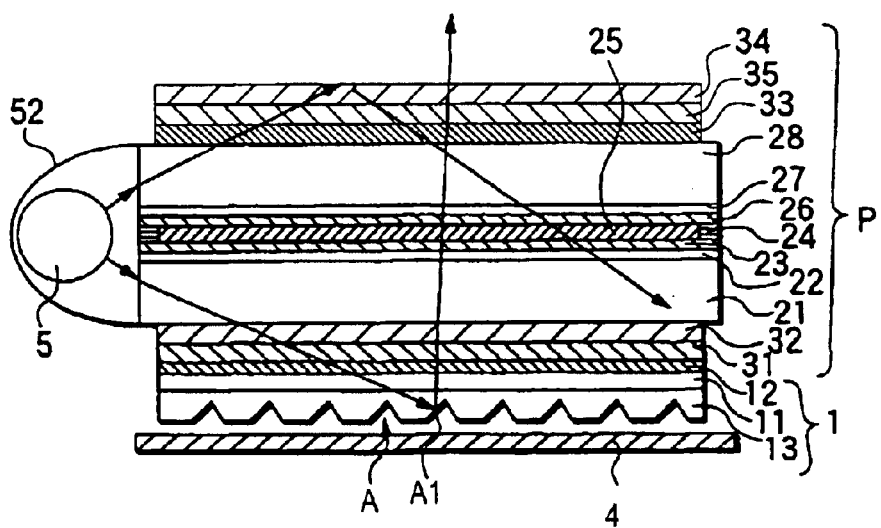
FIG. 8 is a sectional view showing another example of the liquid-crystal display device.

When a reflection layer 4 is disposed on the back side of the optical film 1 as illustrated in FIGS. 7 to 9, the flat surfaces constituted by gentle slopes A3 or film surfaces A4 can function as incidence portions on which external light is made incident and as transmission portions through which the reflected light of the incident light by the reflection layer 4 is transmitted. Hence, display can be made in a reflection mode (in an external light mode) by using external light in a condition that the illuminator is switched off. Hence, a reflection-transmission double type liquid-crystal display device can be formed.

In the aforementioned case, particularly when the optical path changing means A are formed as a repetitive structure in which the optical path changing means A are adjacent to one another and each of the means A has slopes A1 and A3 as shown in FIG. 1C, the angle difference between inclination angles of the gentle slopes A3 with respect to the film plane is selected preferably to be not larger than 5 degrees, more preferably not larger than 4 degrees, further preferably not larger than 3 degrees on the whole of the optical film, and the angle difference between inclination angles of adjacent ones of the gentle slopes A3 is selected preferably to be not larger than 1 degree, more preferably not larger than 0.3 degrees, further preferably not larger than 0.1 degrees. This angle difference selection is to prevent the optical path of the light reflected by the gentle slopes A3 from changing largely, especially from changing largely in between adjacent ones of the gentle slopes A3. This rule is also applied to the plurality of optical path changing means A constituted by the slopes A1 and A3 as shown in FIG. 1F.

From the point of view of obtaining bright display in an external light mode, the projected area or width, on the film plane, of the flat surfaces constituted by gentle slopes A3 or film surfaces A4 each having an inclination angle of not larger than 5 degrees with respect to the film plane is selected preferably to be not smaller than 10 times, more preferably not smaller than 12 times, further preferably not smaller than 15 times as large as the projected area or width, on the film plane, of the slopes A1 or A2 each having an inclination angle of not smaller than 35 degrees with respect to the film plane on which the optical path changing means A are formed. This projected area or width selection is to improve efficiency of incidence of external light and efficiency of transmittance of the light reflected by the reflection layer.

As illustrated in FIGS. 2 to 4, the plurality of optical path changing means A are provided so that the ridgelines of the optical path changing means A are parallel to or inclined to the incidence side surface on which light is incident. In this case, the optical path changing means A may be formed so as to be continued from one end to the other end of the optical film 1 as illustrated in FIGS. 2 and 3, or may be formed intermittently and discontinuously as illustrated in FIG. 4. When the plurality of optical path changing means A are formed discontinuously, it is preferable from the point of view of efficiency of incidence of the transmission light, efficiency of changing the optical path, etc. that the length of each prismatic structures of a groove or a protrusion along the direction of the incidence side surface is selected to be not smaller than 5 times as large as the depth or height of the prismatic structure. It is further preferable from the point of view of uniform light emission on the optical film that the length is selected to be not larger than 500 $\mu$m, particularly in a range of from 10 to 480 $\mu$m, more particularly in a range of from 50 to 450 $\mu$m. Moreover, it is preferable that a projected area of the discontinuous grooves onto an area of the film plane is not larger than 10%.

Any suitable surface shape such as a liner surface, a bent surface, a curved surface, etc., maybe formed as the shape of each of the slopes for constituting the optical path changing means A. The sectional shape of the optical path changing means A and the repetition pitch of the optical path changing slopes A1 are not particularly limited. They can be determined suitably in accordance with the uniformity of light emission on the optical film in a transmission (switching-on) mode because the optical path changing slopes A1 are factors for determining luminance in the transmission mode. They can be further determined suitably in accordance with the uniformity of light emission in an external light mode in a reflection-transmission double type liquid-crystal display device. Hence, the quantity of light the optical path of which is changed can be controlled on the basis of the distribution density of the slopes.

Therefore, the inclination angles of the slopes A1, A2, A3, etc., may be uniform on the whole surface of the film, or may vary so that the optical path changing means A is enlarged as the location goes farther from the incidence side surface on which the light is incident, as illustrated in FIG. 5, for the purpose of making light emission on the optical film uniform against absorption loss and attenuation of transmission light due to the optical path changing. The optical path changing means A may be disposed at regular intervals of a predetermined pitch as illustrated in FIGS. 2 and 3. Alternatively, the optical path changing means A may be disposed at irregular intervals so that the pitch is shortened as the location goes farther from the incidence side surface on which the light is incident. Accordingly, the distribution density of the optical path changing means A is made gradually higher, as illustrated in FIGS. 4 and 6. Alternatively, the optical path changing means may be disposed at a random pitch so that light emission on the optical film can be made uniform. The random pitch is favorable to prevention of moire caused by interference with pixels. Therefore, the optical path changing means A may be constituted by a combination of prismatic structures different in shape, or the like, as well as pitch. Incidentally, in FIGS. 2 to 6, the arrow shows the direction of transmission of the light incident on the incidence side surface.

When a reflection-transmission double type liquid-crystal display device is provided, unnatural display may be caused by shortage of transmission of display light if the optical path changing slopes A1 overlap pixels of the liquid-crystal display panel. From the point of view of preventing the unnatural display from occurring, etc., it is preferable that the overlap area between the pixels and the slopes A1 is reduced as much as possible to thereby ensure sufficient light transmittance through the flat surfaces A3 or A4. From this point of view and in consideration that the pixel pitch of the liquid-crystal display panel is generally in a range of from 100 to 300 µm, each of the optical path changing slopes A1 is selected preferably to be not larger than 40 µm, more preferably in a range of from 3 to 20 µm, further preferably in a range of from 5 to 15 µm in terms of the projected width on the film plane. The projected width is also preferable from the point of view of preventing display quality from being lowered because of diffraction in consideration that the coherent length of a fluorescent tube is generally about 20 µm.

It is preferable from the aforementioned point of view that the distance between adjacent ones of the optical path changing slopes A1 is large. As described above, however, the optical path changing slopes serve as a functional portion for substantially generating illumination light by changing the optical path of the light incident on the side surface. Hence, if the distance is too large, illumination becomes sparse in a switched-on mode so that display may be unnatural. In consideration of these facts, the repetition pitch of the optical path changing slopes A1 is preferably selected to be not larger than 5 mm, more preferably in a range of from 20 µm to 3 mm, further preferably in a range of from 50 µm to 2 mm.

When the optical path changing means are constituted by a repetitive prismatic structure, moire may occur because of interference between the optical path changing means and the pixels of the liquid-crystal display panel. Although moire can be prevented by adjustment of the pitch in the repetitive prismatic structure, the pitch in the repetitive prismatic structure is limited to the aforementioned preferable range. Hence, measures against the case where moire still occurs even if the pitch is in the aforementioned range comes into a question. According to the present invention, it is preferable to use a method in which the ridgelines of the prismatic structures are formed to be inclined with respect to the incidence side surface so that the prismatic structures in the repetitive structure can be arranged to cross the pixels to thereby prevent moire, as illustrated in FIG. 3.

On this occasion, if the inclination angle θ2 to the incidence side surface is too large, deflection occurs in reflection by the optical path changing slopes A1. As a result, large deviation occurs in the direction of changing of the optical path. This large deviation is apt to cause lowering of display quality. Therefore, the inclination angle θ2 of the ridgelines to the incidence side surface is selected preferably to be in a range of ±30 degrees, more preferably in a range of ±25 degrees, further preferably in a range of ±20 degrees. Incidentally, the symbol "±" means the direction of inclination of the ridgelines with the incidence side surface as a reference. If the resolution of the liquid-crystal display panel is so low that moire never occurs, or if moire is negligible, it is preferable that the ridgelines are arranged to be as parallel with the incidence side surface as possible.

The optical film 1 may be arranged so that the transparent film 11 and the repetitive structure of the plurality of optical changing means A may be formed integrally with the transparent film as illustrated in FIG. 1G. Alternatively, a separate layer which has the repetitive structure of the plurality of optical changing means A and which is made of a material the same as or different from that of the transparent film 11 may be provided in close contact with the transparent film to form the optical film 1, as illustrated in FIGS. 1A to 1F and FIG. 1H. In addition, in order to control the retardation or the like, the transparent film 11 maybe formed as at least two layers of overlaid bodies 11A and 11B which are made of the same kind of resin, or different kinds of resins, as illustrated in FIG. 1H. That is, the transparent film 11 does not have to be formed as an integrated single layer body by one kind of material, as illustrated in FIGS. 1A to 1F. Further, the transparent film may be made of a polarizer. On that occasion, a polarizer to be disposed in the liquid-crystal cell separately can be omitted or reduced so that the liquid-crystal display device can be made smaller in thickness. Although the thickness of the transparent film can be determined suitably, it is generally set to be not thicker than 300 µm, particular in a range of from 5 to 200 µm, more particularly in a range of from 10 to 100 µm, from the point of view of making the display device small in thickness.

The optical film having the optical path changing means can be formed by a suitable method. Examples of the suitable method include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or by radial rays such as electron rays is polymerized in the condition that the fluid resin is filled or cast in a mold which is capable of forming a predetermined shape; and so on. The above-mentioned methods are favorable particularly to a transparent film which is formed integrally with optical path changing means so that the transparent film and the repetitive structure of the optical path changing means are provided in the same body.

The preferable example of the method for forming the optical film having the plurality of optical path changing means is a method in which a repetitive prismatic structure having optical path changing slopes is given to one surface of a transparent film by a mold having the predetermined prismatic structures. A specific example of the preferable method comprises the steps of: applying a curable resin polymerizable by ultraviolet rays, radial rays, or the like, onto one surface of a transparent film; curing the curable resin by irradiation with ultraviolet rays, radial rays, or the like, while bringing the coating layer into close contact with a surface of the mold on which the predetermined prismatic structure is formed; and stripping off and collecting the transparent film from the mold. Another specific example of the preferable method comprises the steps of: filling a mold with the curable resin on the surface of the mold on which the predetermined prismatic structure is formed; curing the resin layer by irradiation with ultraviolet rays, radial rays, or the like while disposing a transparent film tightly on the resin layer; and stripping off and collecting the transparent film from the mold. Thus, in the preferable method, a repetitive structure layer of a plurality of optical path changing means is formed on the transparent film as a separate layer.

In the latter specific example of the preferable method, the optical path changing means are added to the transparent film. In such a manner, if there is a large difference in refractive index between the repetitive structure layer of the added optical path changing means and the transparent film, light exit efficiency may be reduced largely because of interface reflection or the like. From the point of view to prevent the reduction of the light exit efficiency, it is preferable that the difference in refractive index between the transparent film and the repetitive structure layer of the optical path changing means is made as small as possible, particularly larger than 0.10, more particularly not larger than 0.05. In addition, in that case, it is preferable that the refractive index of the repetitive structure layer of the added optical path changing means is made higher than that of the transparent film from the point of view of the light exit efficiency. Incidentally, a suitable transparent material corresponding to the wavelength range of incident light may be used to form the repetitive structure layer of the optical path changing means, similarly to the case with the transparent film.

Incidentally, the transparent film or the optical path changing means may be made of a suitable material exhibiting transparency and corresponding to the wavelength range of light which is made to enter the transparent film or the optical path changing means from the illuminator, or the like. Incidentally, examples of the suitable material used in a visible light range include: transparent resin represented by acrylic resin, polycarbonate resin, cellulose resin, norbornene resin, or the like; curable resin which can be polymerized by heat, by ultraviolet rays, or by radial rays such as electron rays; and so on.

Particularly, from the point of making the in-plane retardation not larger than 30 nm, it is preferable to use a material exhibiting no birefringence or low birefringence. In addition, internal stress may be generated in the transparent film in the process of bonding. From the point of view of prevention of a retardation produced by such internal stress, it is preferable that a material small in photoelastic coefficient is used. Although the thickness of the transparent film may be determined suitably, it is generally made not thicker than 300 $\mu$m, particularly in a range of from 5 to 200 $\mu$m, more particularly in a range of from 10 to 100 $\mu$m from the point of view of making the optical film thinner. Incidentally, the transparent film may be formed as at least two layers of overlaid bodies 11A and 11B which are formed out of the same kind of resin or different kinds of resins, as illustrated in FIG. 1H. That is, the transparent film does not have to be formed as an integrated single layer body formed of one kind of material.

As illustrated in FIGS. 1A to 1H, the optical film is designed to have adhesive means 12 (tacky layer) on the surface of the transparent film 11 on which the repetitive prismatic structure 13 is not formed. Such adhesive means 12 is to bond the optical film to a support member such as a liquid-crystal display panel or the like. The bonding process through the adhesive means is performed for the following purposes: improvement of reflection efficiency by the optical path changing slopes A1 of the plurality of optical path changing means A; accordingly, improvement of luminance owing to effective utilization of the incident light on the side face; and so on. From the point of view of these purposes, according to the present invention, the adhesive means is set to have a refractive index of not lower than 1.49. If it is necessary to restrain total reflection on the bonded interfaces between the optical film and the liquid-crystal display panel or the like to enhance the entrance efficiency of the light, which is transmitted through the panel to enter the optical film, and therefore to obtain a liquid-crystal display device the display of which is bright and excellent in uniformity of brightness; the refractive index of the adhesive means is preferably not lower than 1.50, more preferably not lower than 1.51, further preferably not lower than 1.52.

Incidentally, an optical glass plate is usually used as each cell substrate of the liquid-crystal cell. When the optical glass plate is a non-alkali glass plate, the refractive index of the non-alkali glass plate is generally in a range of from about 1.51 to about 1.52, and the bonding process is ideally performed through adhesive means which has a higher refractive index than the above range. Thus, most of the transmission light which has an angle large enough to make the light enter the optical film from the cell can be made to enter the optical film without being totally reflected on the bonded interfaces. If it is necessary to restrain the loss of the quantity of light which occurs because light cannot exit due to the trapping effect based on total reflection, and if it is therefore necessary to improve display luminance, uniformity of in-plane brightness, the difference in refractive index in each of interfaces among light transmission type optical layers such as the adhesive means, the liquid-crystal cell, the transparent film and so on is preferably not larger than 0.15, more preferably not larger than 0.10, further preferably not larger than 0.05. If the refractive index of the adhesive means or the transparent film were too high, the following problems are apt to arise: increase in loss of the quantity of light due to interface reflection caused by the large difference in refractive index, particularly increase in reflectivity of transmission light which is substantially in parallel with the cell; increase in light absorption, particularly increase in absorption of short-wavelength light of visible light; coloring because of wavelength dispersion, particularly increase of yellow degrees in the case of ultraviolet-curing resin; deterioration in bonding properties of the adhesive layer or production of light absorption; and so on. To avoid these problems, it is therefore preferable that the adhesive means is set to have a refractive index of not higher than 1.6, particularly not higher than 1.55, more particularly not higher than 1.53, and the transparent film is set to have a refractive index of not higher than 1.6, particularly not higher than 1.58, more particularly not higher than 1.55, further particularly not higher than 1.53.

The adhesive means can be formed from a suitable adhesive agent exhibiting the aforementioned refractive index without any particular limit. For example, an adhesive agent to be hardened by irradiation with ultraviolet rays or radial rays or by heating can be used. From the point of view of handling properties such as facilitation of the bonding process, or from the point of view of stress relaxation ability to suppress the internal stress from generating, a tacky layer is preferably used as the adhesive means. A suitable tackiness agent can be used for the formation of the tacky layer. The suitable tackiness agent contains, as abase polymer, a suitable polymer such as a rubber polymer, an acrylic polymer, a vinyl-alkyl-ether polymer, a silicone polymer, a polyester polymer, a polyurethane polymer, a polyether polymer, polyamide polymer, a styrene polymer, etc. Especially, a tackiness agent excellent in transparency, weather resistance, heat resistance, etc. such as an acrylic tackiness agent containing, as a base polymer, a polymer mainly containing alkyl ester of acrylic acid or methacrylic acid is used preferably to from the tacky layer.

Figure 13:
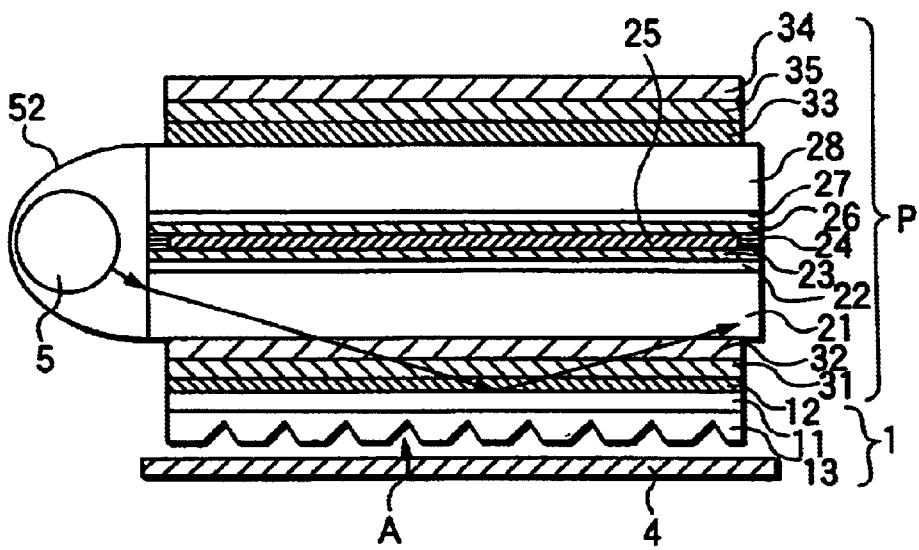
FIG. 13 is a sectional view showing an example of a liquid-crystal display device wherein light may be enclosed by the optical film due to interface reflection between the transparent film and the tacky layer due to the difference in refractive index therebetween.

As indicated by the arrow in FIG. 13, light maybe enclosed by the optical film due to interface reflection between the transparent film and the tacky layer due to the difference in refractive index therebetween. From the point of view of preventing the light from being unable to exit from the optical film so as to suppress the loss of the quantity of light, a tacky layer having a refractive index different by 0.12 or less, particularly different by 0.10 or less, more particularly different by 0.05 or less from that of the transparent film is preferably used. In this case, the tacky layer can be formed to be of a light diffusion type. Further, from the same point of view as mentioned above, it is preferable that the difference in refractive index between the tacky layer and the support member to which the tacky layer is pasted is not larger than 0.15, especially not larger than 0.10, more especially not larger than 0.05.

As transparent particles mixed with the adhesive means (tacky layer), there can be used one or two or more members suitably selected from the group consisting of inorganic particles of silica, alumina, titania, zirconia, tin oxide, indium oxide, cadmium oxide, antimony oxide, or the like, which may be electrically conductive; and organic particles of a crosslinked or non-crosslinked polymer, or the like. In such a manner, the adhesive means may be made to be of a light diffusion type. Incidentally, a strip sheet 14 may be preferably temporarily bonded to the adhesive means as shown in FIGS. 1A to 1H so that the adhesive means is covered with the strip sheet 14 before the adhesive means is put into practical use for the purpose of anti-contamination against deposition of foreign matters, etc.

A base material such as a sheet for the purpose of protecting the optical path changing slopes may be disposed closely on a surface of the transparent film on which the optical path changing means are formed. As shown in FIGS. 7 to 9, the optical film may be also formed so that a reflection layer 4 is disposed closely on a surface of the transparent film 11 on which the optical path changing means are formed. The reflection layer is provided for reflecting and inverting light leaking from a surface of the transparent film on which the optical path changing slopes are formed, and provided for making the reflected and inverted light enter the optical film again. As a result, light utilizing efficiency can be improved, so that a reflection-transmission double type liquid-crystal display device can be formed.

The reflection layer can be formed of a suitable material such as a white sheet similarly to the background art. Especially, a preferable example of the high-reflectance reflection layer is constituted by: a coating layer containing powder of a high-reflectance metal such as aluminum, silver, gold, copper, chromium, etc., or alloy powder of such a high-reflectance metal in a binder resin; a layer of the above-mentioned metal or a dielectric multilayer film deposited by a suitable thin-film forming method such as a vacuum vapor deposition method, a sputtering method, or the like; a reflection sheet having the coating layer or the deposited layer supported by a base material made of a film, or the like; a sheet of metal foil; and so on. The high-reflectance reflection layer is especially preferably used for forming a reflection-transmission double type liquid-crystal display device.

The reflection layer to be formed may exhibit a light diffusing function. The reflection layer has a diffuse reflection surface for diffusing the reflected light to thereby attain improvement in frontal directivity. When the reflection layer is formed by a surface roughening process, the reflection layer can prevent the production of Newton rings due to its close contact to the film to thereby improve visibility. The formation of the reflection layer of the light diffusion type can be made by a method, for example, comprising the steps of: forming a surface of a film base material as a fine prismatic structure by a suitable method such as a surface roughening method using sandblasting, matting, or the like, or a particle adding method; and providing a reflection layer on the film base material so that the fine prismatic structure is reflected in the reflection layer. The reflection layer having such a fine prismatic structure to reflect the fine prismatic structure on the surface of the film base material can be formed by providing a metal on the surface of the film base material by a suitable vapor deposition or plating method such as a vacuum vapor deposition method, an ion-plating method, a sputtering method, or the like.

The optical film according to the present invention has optical path changing slopes by which the optical path of the light incident on the side surface from the illuminator, or the like, or the transmission light of the incident light is changed to a direction excellent in perpendicularity in favor of viewing. Hence, light can be made to exit with good light utilizing efficiency. Moreover, the optical film exhibits good transmittance to external light. When the optical film is disposed on the visual side (front side) or opposite side (back side) of the liquid-crystal display P provided with the illuminator 5 or 51 disposed on at least one side of the liquid-crystal display panel P as illustrated in FIGS. 8 and 9, it is possible to form various devices such as a transmission type liquid-crystal display device which is bright and easy to view, a reflection-transmission double type liquid-crystal display device which is excellent in power saving, or the like.

Incidentally, in the liquid-crystal display device, a great part of the light incident on the incident side surface from the illuminator 5 or 51 is reflected through the upper and lower cell substrates 21 and 28 in accordance with the law of refraction on the basis of thickness proportion of respective layers in the liquid-crystal display panel as indicated by the arrows in FIG. 7. That is, most of the incident light is reflected at a total reflection angle of about ±42 degrees on a glass substrate having a refractive index of 1.5. Thus, the light is transmitted backward efficient so as to prevent from exiting (leaking) from the surface of the panel. At this time, the optical path of the light incident on the optical path changing slopes A1 of the optical film 1 is efficiently changed to the viewing direction, that is, to the frontal direction. Hence, display excellent in uniformity of brightness on the whole surface of the panel display screen can be achieved. Then, the optical film is formed to have layers of adhesive means, a transparent film and optical path changing means which have a refractive index equal to or larger than that of the cell substrate on the side where the optical film is disposed. As a result, in-cell transmission light enters the optical film efficiently without being totally reflected on the interfaces among the layers and the cell substrate.

In the above description, a suitable transmission type liquid-crystal display panel including a liquid-crystal cell can be used as the liquid-crystal display panel P. That is, as illustrated in FIGS. 8 and 9, it is possible to use, as the liquid-crystal display panel P, a transmission type liquid-crystal display panel which has liquid crystal 25 enclosed by cell substrates 21 and 28 through a sealing material 24 so that the incident light from a side of arrangement of the optical film 1 is made to exit as display light from the other side through control of the liquid crystal, or the like. The liquid-crystal display panel P is not particularly limited in kind.

Incidentally, specific examples of the liquid-crystal cell include a twisted or non-twisted cell such as a TN liquid-crystal cell, an STN liquid-crystal cell, an IPS liquid-crystal cell, an HAN cell, an OCB cell, or a VA liquid-crystal cell; a guest-host or ferroelectric liquid-crystal cell; a light diffusion type liquid-crystal cell such as an internal diffusion type liquid-crystal cell; and soon. Further, a suitable drive method such as an active matrix method or a passive matrix method may be used as the method for driving liquid crystal. As illustrated in FIGS. 8 and 9, the liquid crystal is generally driven through transparent electrodes 22 and 27 provided on the inner surfaces of the pair of cell substrates 21 and 28.

A suitable transparent substrate such as a glass substrate or a resin substrate can be used as each of the cell substrates. Especially, a transparent substrate made of an optically isotropic material is preferably used from the point of view of display quality, etc. A substrate such as a non-alkali glass plate exhibiting excellent colorlessness and transparency with respect to a blue glass plate is preferably used from the point of view of improvement of luminance and display quality, etc. A resin substrate is preferably used from the point of view of reduction in weight, etc. A blue glass plate having a refractive index in a range of about 1.47 to 1.49 is often used as a cell substrate in a passive driving TN or STN cell. In that case, if an optical film constituted by adhesive means and a transparent film each having a refractive index of not lower than 1.49 is used, total reflection on the interfaces can be prevented so that reflection loss of the transmission light can be reduced. On the other hand, the above-mentioned non-alkali glass plate is often used as a cell substrate in an active matrix type TFT or TFD cell or the like after a semiconductor film is provided in the cell necessarily. In that case, when an optical film which is constituted-by adhesive means and a transparent film each having a refractive index of not lower than 1.50 is used, the angle with which total reflection takes place can be reduced so that reflection loss of transmission light can be reduced. Also in the case of the non-alkali glass plate used in the TFT and TFD cell, when an optical film which is constituted by adhesive means and a transparent film each having a refractive index of not lower than 1.51 is used, total reflection on the interfaces can be prevented so that reflection loss of transmission light can be reduced. Incidentally, in the case of a resin substrate, for example, in the case of an epoxy resin substrate having a refractive index of about 1.51, an optical film similar to that in any one of the aforementioned cases of the non-alkali glass plate can be used preferably. The thickness of the cell substrate can be determined suitably in accordance with enclosing strength of liquid crystal, or the like, without any particular limitation. The thickness of the cell substrate is generally selected to be in a range of from 10 $\mu$m to 5 mm, especially in a range of from 50 $\mu$m to 2 mm, more especially in a range of from 100 $\mu$m to 1 mm, from the point of view of balance between light transmission efficiency and reduction in thickness and weight.

When the liquid-crystal cell is formed, one suitable functional layer, or, two or more suitable functional layers may be provided as occasion demands. Examples of such a suitable functional layer include an aligned film made of a rubbed film for aligning the liquid crystal, a color filter for color display, and so on. Incidentally, aligned films 23 and 26 are generally formed on transparent electrodes 22 and 27 respectively as shown in FIGS. 8 and 9. A color filter not shown is generally provided between one of the cell substrates 21 and 28 and corresponding one of the transparent electrodes.

One suitable optical layer, or, two or more suitable optical layers such as polarizer 31 and 34, retarders 32 and 33, a light diffusing layer may be added to the liquid-crystal display panel, as illustrated in FIGS. 8 and 9. The polarizers are provided for achievement of display by using linearly polarized light. The retarders are provided for improvement of display quality by compensation for retardation due to birefringence of liquid crystal, etc. The light diffusing layer is provided for the following purposes: enlargement of a display range by diffusion of display light, uniformity of luminance by leveling of emission-line-like light emission through slopes of the optical film, increase of the quantity of light entering the optical film by diffusion of transmission light in the liquid-crystal display panel, etc.

A suitable plate can be used as the polarizer without any particular limitation. From the point of view of obtaining good-contrast-ratio display due to incidence of highly linearly polarized light, etc., a film high in the degree of polarization may be preferably used. Examples of the preferable film include; an absorption type polarizing film made of a drawn film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film; a film in which a transparent protective layer is provided on one or either side of the aforementioned absorption type polarizing film, or the like.

A material excellent in transparency, mechanical strength, thermal stability, moisture shielding characteristic, etc. is preferably used for the formation of the transparent protective layer. Examples of the material include: polymers such as acetate resin, polyester resin, polyether-sulfone resin, polycarbonate resin, polyamide resin, polyimide resin, polyolefin resin, acrylic resin, polyether resin, polyvinyl chloride resin, styrene resin and norbornene resin; heat-curable or ultraviolet-curable resins such as acrylic resin, urethane resin, acrylic urethane resin, epoxy resin, silicone resin, etc.; and so on. The transparent protective layer may be bonded as a film by a bonding method or may be applied as polymer liquid by a coating method, and so on.

The polarizer to be used, especially the polarizer disposed on the visual side liquid-crystal display panel may be subjected to non-glare treatment or anti-reflection treatment for preventing viewing from being disturbed by surface reflection of external light. Non-glare treatment can be made to form a surface of the polarizer as a fine prismatic structure. In the non-glare treatment, various methods may be used for forming a surface of the polarizer as a fine prismatic structure. Examples of the methods include: a surface roughening method such as a sandblasting method, an embossing method, etc.; a method of mixing transparent particles such as silica particles; and so on. Anti-reflection treatment can be made by a method of forming a coherent vapor deposition film, or the like. Alternatively, non-glare treatment or anti-reflection treatment can be made by a method of bonding a film having a surface structure of fine prismatic structures or an interference film. Incidentally, two polarizers may be provided on opposite sides of the liquid-crystal cell respectively, as shown in the FIGS. 8 and 9, or one polarizer may be provided on only one side of the liquid-crystal cell.

On the other hand, each of the retarders may be formed of a suitable material. Examples of the material include a birefringence film obtained by drawing a film of a suitable polymer as illustrated in the description of the transparent protective layer by a suitable method such as monoaxial drawing or biaxial drawing; an aligned film of a suitable liquid-crystal polymer such as a nematic liquid-crystal polymer or a discotic liquid-crystal polymer, and an aligned layer of the aligned film supported by a transparent base material. A material having a refractive index controlled in a direction of thickness under the operation of heat shrinkage force of a heat-shrinkable film may be also used.

The compensatory retarders 32 and 33 shown in FIGS. 8 and 9 are generally disposed between the back side polarizer 31 and the liquid-crystal cell and between the visual side polarizer 34 and the liquid-crystal cell, respectively, as occasion demands. A suitable material can be used as each of the retarders corresponding to the wavelength range, etc. Each of the retarders may be formed of a laminate of two or more layers in order to control optical characteristic such as retardation, etc.

A coating layer, a diffusing sheet, or the like, having a surface structure of fine prismatic structures similarly to that of the non-glare layer can be used to form the light diffusing layer by a suitable method. The light diffusing layer may be disposed as an adhesive layer 35 prepared in the same manner as the transparent particles-containing adhesive layer 12. In this case, the light diffusing layer can serve also as an adhesive layer 35 for bonding the polarizer 34 and the retarder 32 to each other, as shown in FIGS. 8 and 9. Hence, reduction in thickness can be achieved. Although the light diffusing layer can be disposed on the outer side (visual side) of the polarizer, arrangement of the light diffusing layer on the liquid-crystal cell side as shown in FIGS. 8 and 9 is more favorable than arrangement of the light diffusing layer on the polarizer 34 side. This is because external light is made incident on the light diffusing layer after absorption by the polarizer so that reflection loss caused by backward scattering through the light diffusing layer can be suppressed.

On the other hand, the illuminator disposed on one of side surfaces of the liquid-crystal display panel is provided so that light to be utilized as light for illuminating the liquid-crystal display device is made to incident on the side surface of the liquid-crystal display panel. Hence, reduction in thickness and weight of the liquid-crystal display device can be achieved when the illuminator is used in combination with the optical film disposed on the back or front side of the panel. A suitable illuminator can be used as the illuminator. Examples of the illuminator preferably used include a linear light source such as a (cold or hot) cathode tube, a point light source such as a light-emitting diode, an array of point light sources arranged in line or plane, and a combination of a point light source and a linear light pipe for converting the incident light from the point light source into light of a linear light source through the linear light pipe.

One illuminator 5 maybe disposed on one of side surfaces of the liquid-crystal display panel P as shown in FIG. 8, or illuminators 5 and 51 maybe disposed on two or more side surfaces of the liquid-crystal display panel P as shown in FIG. 9. When illuminators are disposed on a plurality of side surfaces, the plurality of side surfaces may be provided as a combination of side surfaces opposite to each other as shown in FIG. 9, or may be provided as a combination of side surfaces crossing each other. Further, the plurality of side surfaces may be provided as a combination of three or more side surfaces by use of the aforementioned combinations together.

The illuminator makes it possible to view the liquid-crystal display device in a transmission mode in which the illuminator is switched on. When the liquid-crystal display device is provided as a reflection-transmission double type liquid-crystal display device, the illuminator can be switched on/off because the illuminator is not necessary to be switched on when the display device is viewed in a reflection mode by using external light. Any suitable method can be used for switching on/off the illuminator. Any one of background-art methods may be used. Incidentally, the illuminator may be of a multicolor light emission type in which the color of emitted light can be changed. Or different types of illuminators may be provided so that multicolor light emission can be made through the different types of illuminators.

As shown in FIGS. 8 and 9, each of the illuminators 5 and 51 may be used in combination with a suitable assisting means such as a reflector 52. The reflector 52 is provided for enclosing the illuminator to lead scattered light to side surfaces of the liquid-crystal display panel P as occasion demands. A suitable reflection sheet such as a resin sheet provided with a high-reflectance metal thin film, a white sheet, a sheet of metal foil, etc. may be used as the reflector. The reflector may be used also as a fixing means for enclosing the illuminator by a method of bonding end portions of the reflector to end portions of the cell substrates of the liquid-crystal display panel correspondingly.

In the present invention, optical devices or parts such as a liquid-crystal cell, a polarizer, a retarder, etc. for forming the liquid-crystal display device may be wholly or partially integrally laminated/fixed onto one another or may be may be disposed separately. From the point of view of prevention of lowering of contrast by suppression of interface reflection, etc., it is preferable that such optical devices or parts are fixed onto one another. A suitable adhesive means such as a tackiness agent can be used for the closely fixing these devices or parts. The suitable adhesive layer may contain transparent particles, etc., as described above so as to be an adhesive layer exhibiting a diffusing function.

The optical devices or parts, especially visual side optical devices or parts, maybe formed to have ultraviolet-ray absorbing power by a method of treatment with an ultraviolet-ray absorbent such as a salicylic ester compound, a benzophenone compound, a benzotriazole compound, a cyanoacrylate compound, a nickel complex salt compound, etc.

EXAMPLE 1

A mold processed into a predetermined shape in advance was filled with acrylic ultraviolet-curable resin (ARONIX UV-3701, made by TOAGOSEI Co., Ltd.) by dropping with a dropper. An 80 μm-thick triacetylcellulose (TAC) film (having a saponified surface) was disposed quietly on the resin, and made to adhere closely to the resin by a rubber roller so as to eliminate excessive resin and bubbles. The TAC film with the resin was irradiated with ultraviolet rays by a metal halide lamp so as to be cured. The resin-including TAC film cured thus was stripped off from the mold and cut into a predetermined size. Thus, a transparent film was obtained so that a layer of a plurality of optical path changing means having a refractive index of 1.533 was formed on the TAC film having a refractive index of 1.49. Then, a tacky layer with a refractive index of 1.47 was provided on the other surface of the transparent film on which the plurality of optical path changing means were not formed. Thus, an optical film was obtained.

Incidentally, the optical film was 60 mm wide and 45 mm deep, and had prism-like concave portions formed at intervals of a pitch of 210 μm (FIG. 1C). The ridgelines of the concave portions were continued and parallel with one another in the widthwise direction of the optical film. The inclination angles of optical path changing slopes A1 of the concave portions vary in a range of from 42.5 to 43 degrees while the inclination angles of gentle slopes A3 thereof vary in a range of from 1.8 to 3.5 degrees, so that the difference in inclination angle between adjacent ones of gentle slopes was not larger than 0.1 degrees. The projected width of each of the optical path changing slopes on the film plane was in a range of from 10 to 16 μm, and the ratio of the projected area of the gentle slopes on the film plane to the projected area of the optical path changing slopes on the film plane was not smaller than 12 times.

Next, a tacky layer containing resin particulates was provided on a TAC film so as to form a light diffusing film. The light diffusing film was bonded onto the visual side of a TN type liquid-crystal cell which was already available on the market, while polarizers were pasted on the front and back sides of the cell. Thus, a normally white transmission type TN liquid-crystal display panel was formed. A cathode-ray tube was disposed on one of side surfaces of the liquid-crystal display panel, and enclosed by a reflector of a silver-vapor-deposited reflection sheet. Opposite end portions of the reflector were bonded to the upper and lower surfaces of the panel so that the cathode-ray tube was fixed. Then, the aforementioned optical film was bonded onto the polarizer on the back side (opposite to the visual side) of the panel through the tacky layer of the optical film so that the optical path changing slopes were parallel to and faced the cathode-ray tube. A reflection sheet made of a white polyester film is disposed on the back side of the optical film. Thus, a reflection-transmission double type liquid-crystal display device was obtained.

EXAMPLE 2

A transmission type liquid-crystal display device was obtained by using an optical film in the manner similar to that in Example 1, except that the optical film was formed to have a plurality of optical path changing means (FIG. 1B) each of which had an optical path changing slope A1 inclined at an angle of about 42 degrees, a steep slope A2 having a vertex angle of 70 degrees with the optical path changing slope A1, and a flat surface A4 having a projected area not smaller than 10 times as large as the total projected area of the optical path changing slope A1 and the steep slope A2 on the film plane.

EXAMPLE 3

A transmission type liquid-crystal display device was obtained by using an optical film (FIG. 6) in the manner similar to that in Example 1, except that the optical film was formed to have a plurality of optical path changing means each having a length of 80 μm (FIG. 1B). Each of the plurality of optical path changing means had an optical path changing slope A1 which had an inclination angle of about 42 degrees and which had a projected width of 10 μm on the film plane, and a steep slope A2 which had an inclination angle of about 55 degrees. The plurality of optical path changing means were disposed so that the lengths of the plurality of optical path changing means were substantially parallel with one another in the widthwise direction of the optical film, and so that the density of the optical path changing means became gradually higher as the location went farther from the side surface, on which the light is incident, in the widthwise direction of the optical film. Incidentally, the area of each of the flat surfaces A4 was not smaller than 10 times as large as the total projected area of the corresponding optical path changing slope A1 and the corresponding steep slope A2 on the film plane.

EXAMPLE 4

A transmission type liquid-crystal display device was obtained by using an optical film (FIG. 4) in the manner similar to that in Example 1, except that the optical film was formed to have a plurality of optical path changing means each having a length of 80 μm (see FIG. 1A) and except that cathode-ray tubes were disposed on opposite side surfaces of the optical film. Each of plurality of optical path changing means was shaped like an isosceles triangle by two optical path changing slopes A1 each of which had an inclination angle of about 42 degrees and a projected width of 10 μm on the film plane. The plurality of optical path changing means were disposed at random so that the lengths of the optical path changing means were parallel with one another in the widthwise direction of the optical film, and so that the density of the plurality of optical path changing means became gradually higher as the location went toward the center portion from the side surface, on which the light is incident, in the widthwise direction of the optical film. Incidentally, the projected area of each of the flat surfaces A4 was not smaller than 10 times as large as the total projected area of every two of the optical path changing slopes A1 on the film plane.

EXAMPLE 5

A transmission type liquid-crystal display device in a two-incidence-side-surface system was obtained by using an optical film in the manner similar to that in Example 4, except that the optical film was formed to have a plurality of optical path changing means (see FIG. 1E). Each of plurality of optical path changing means had a length of 80 μm, was constituted by a groove shaped substantially like an tetragon in section. In the groove, there were two optical path changing slopes A1 each of which had an inclination angle of about 42 degrees and a projected width of 10 μm on the film plane. The plurality of optical path changing means were disposed at random so that the lengths of the optical path changing means were substantially parallel with one another in the widthwise direction of the optical film, and so that the density of the plurality of optical path changing means became gradually higher as the location went toward the center portion from the side surface, on which the light is incident, in the widthwise direction of the optical film. Incidentally, the projected area of each of the flat surfaces A4 was not smaller than 10 times as large as the total projected area of each of the optical path changing means on the film plane.

EXAMPLE 6

A reflection-transmission double type liquid-crystal display device was obtained by using an optical film in the manner similar to that in Example 2, except that the optical film had a reflection layer of a silver-vapor-deposited film disposed on the surface of the optical film on which the optical path changing means were formed, and except that reflector on the back side was omitted.

Comparative Example 1

Figure 14:
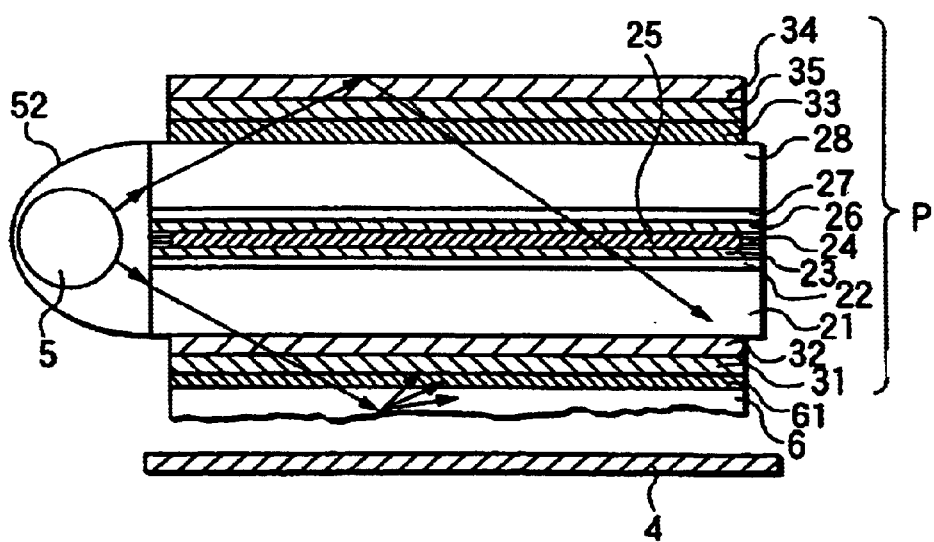
FIG. 14 is a sectional showing an example of a background-art transmission type liquid-crystal display device.

A transmission type liquid-crystal display device (FIG. 14) was obtained in the manner similar to that in Example 1, except that the optical film was replaced by a scattering sheet having a surface roughened by sandblasting. Incidentally, the scattering sheet was disposed so that the roughened surface was on the back side (opposite to the visual side).

Comparative Example 2

A transmission type liquid-crystal display device was obtained by using an optical film in the manner similar to that in Example 1, except that the optical film was formed to have a plurality of optical path changing means (FIG. 1B) each of which had an optical path changing slope A1 inclined at an angle of about 30 degrees, a steep slope A2 having a vertex angle of 70 degrees with the optical path changing slope A1, and a flat surface A4 having a projected area not smaller than 10 times as large as the total projected area of the optical path changing slope A1 and the steep slope A2 on the film plane.

Comparative Example 3

A transmission type liquid-crystal display device was obtained in the following manner. A cathode-ray tube was disposed on one of side surfaces of a light pipe which had a embossed rough surface on the back side (opposite to the visual side) and which was 1.2 mm thick. The cathode-ray tube was enclosed by a reflector made of a silver-vapor-deposited reflection sheet. Opposite end portions of the reflector were bonded onto the upper and lower surfaces of the light pipe. The light pipe obtained thus was disposed on a reflector made of a white polyester film, and a normally white transmission type TN liquid-crystal panel which was already available on the market was disposed on the light pipe through a light scattering plate.

Comparative Example 4

A reflection-transmission double type liquid-crystal display device was obtained in the manner similar to that in Example 6, except that a scattering film in Comparative Example 1 which had a reflection layer of a silver-vapor-deposited film disposed on the scattering surface was used and except that the reflector on the back side was omitted.

Comparative Example 5

A reflection-transmission double type liquid-crystal display device was obtained in the manner similar to that in Example 6, except that an optical film in Comparative Example 2 had a reflection layer of a silver-vapor-deposited film disposed on the surface on which optical path changing means were formed, and except that the reflector on the back surface side was omitted.

Evaluation Test 1

Frontal luminance in the center portion of the transmission type or reflection-transmission type liquid-crystal display device obtained in each of Examples 1 to 6 and Comparative Examples 1 to 5 was measured by a luminance meter (BM-7 made by TOPCON Corp.) in a transmission mode in which the cathode-ray tube(s) was (or were) switched on in the condition that no voltage was applied to the liquid-crystal display panel. In addition, frontal luminance was also measured in a white state in a reflection mode in which the cathode-ray tube(s) was (or were) switched off while external light by using ring-like illumination was made incident at an angle of 15 degrees. Results of the measurement were shown in the following Table 1.

| | Frontal luminance (cd/m²) | |
| --- | --- | --- |
| | transmission mode | reflection mode |
| Example 1 | 20 | — |
| Example 2 | 20 | — |
| Example 3 | 24 | — |
| Example 4 | 36 | — |
| Example 5 | 36 | — |
| Example 6 | 20 | 436 |
| Comp. Example 1 | 4 | — |
| Comp. Example 2 | 8 | — |
| Comp. Example 3 | 34 | — |
| Comp. Example 4 | 4 | 386 |
| Comp. Example 5 | 10 | 410 |

It is apparent from the Table 1 that frontal luminance in each of Examples 1 to 6 superior to that in any one of Comparative Examples 1, 2, 4 and 5 was attained. This is because light was made to exit in a direction reverse to the light source in the transmission mode in Comparative Examples 1, 2, 4 and so that the exit light was insufficient in frontal luminance so as to be difficult to contribute to display. Particularly in Comparatives 1 and 4, the exit light was insufficient in any direction.

On the other hand, in Examples 4 and 5, it is apparent that luminance was enhanced conspicuously due to the two-light-source system so that brightness surpassed that in Comparative Example 3 in which a side-lighting type light pipe was used. Incidentally, in the system of using the side-lighting light pipe in Comparative Example 3, increase in thickness of the liquid-crystal display device due to the light pipe appeared conspicuously so that it was difficult to reduce the thickness of the liquid-crystal display device. Further, each of Examples 1 to 6 had no problem in viewing in the transmission mode in which a voltage was applied to the liquid-crystal display panel, so that excellent display quality was ensured. In addition, in Example 2, easy viewing in the case of removing the light diffusing film was inferior to that in the case of providing the light diffusing film. However, frontal luminance in the above-mentioned cases stood comparison with each other.

On the other hand, although display in the reflection mode in each of Example 6 and Comparative Examples 4 and 5 had no image disorder or the like in the condition that the liquid-crystal display panel was supplied with a voltage, display in Comparatives 4 and 5 was darker than that in Example 6. It is understood from the above description that bright display was attained in the transmission mode in each of Embodiment 1 to 6, and bright display was attained also in the reflection mode in Embodiment 6. It is therefore proved that, according to the present invention, it is possible to form a transmission type or reflection-transmission double type liquid-crystal display device which is prevented from increasing in bulk and weight caused by a light pipe, and which is hence made small in thickness and light in weight by a film system, and which is good in display quality.

EXAMPLE 7

A mold processed into a predetermined shape in advance was filled with acrylic ultraviolet-curing resin (ARONIX UV-3701, made by TOAGOSEI Co., Ltd.) by dropping with a dropper. An 80 μm-thick triacetylcellulose (TAC) film (having a saponified surface) was disposed quietly on the resin, and made to adhere closely to the resin by a rubber roller so as to eliminate excessive resin and bubbles. The TAC film with the resin was irradiated with ultraviolet rays by a metal halide lamp so as to be cured. The resin-including TAC film cured thus was stripped off from the mold and cut into a predetermined size. Thus, a transparent film was obtained so that a layer of a plurality of optical path changing means having a refractive index of 1.533 was formed on one surface of the TAC film having are fractive index of 1.49. Then, a tacky layer with a refractive index of 1.47 was provided on the other surface of the transparent film on which the plurality of optical path changing means were not formed. Thus, an optical film was obtained. A reflection layer formed of a silver-vapor-deposited film was provided on the surface of the optical film on which the optical path changing means were formed.

The average in-plane and thicknesswise retardations of the optical film were 6 nm and 44 nm, respectively. The optical film was 60 mm wide and 45 mm deep, and had optical path changing means (FIG. 1B) forming continuous grooves at intervals of a pitch of 210 μm. The ridgelines of the grooves were parallel with one another in the width direction of the optical film. In each of the optical path changing means, an optical path changing slope A1 was about 42 degrees in inclination angle, 10 to 16 μm in width, and 70 degrees in vertex angle with a steep slope A2. In each of the plurality of optical path changing means, the projected area of a flat surface portion A4 was not smaller than 10 times as large as the total projected area of the corresponding optical path changing slope A1 and the corresponding steep slope A2 on the film plane.

Next, a tacky layer containing resin particulates was provided on a TAC film so as to form a light diffusing film. The light diffusing film was bonded onto the visual side of a TN type liquid-crystal cell which was already available on the market, while polarizers were pasted on the front and back sides of the cell. Thus, a normally white transmission type TN liquid-crystal display panel was formed. A cathode-ray tube was disposed on one of side surfaces of the liquid-crystal display panel, and enclosed by a reflector of a silver-vapor-deposited reflection sheet. Opposite end portions of the reflector were bonded to the upper and lower surfaces of the panel so that the cathode-ray tube was fixed. Then, the aforementioned optical film was bonded onto the polarizer on the back side (opposite to the visual side) of the panel through the tacky layer of the optical film so that the optical path changing slopes were parallel to and faced the cathode-ray tube. Thus, a reflection-transmission double type liquid-crystal display device was obtained.

EXAMPLE 8

An optical film the average in-plane and thicknesswise retardations of which were 2 nm and 32 nm respectively was obtained in the manner similar to that in Example 7, except that the thickness of the TAC film was made 40 μm. A reflection-transmission double type liquid-crystal display device was obtained by using the thus obtained optical film.

Comparative Example 6

A reflection-transmission double type liquid-crystal display device (FIG. 14) was obtained in the manner similar to that in Example 7, except that the optical film was replaced by a scattering film having a surface roughened by sand blasting. The average in-plane and thicknesswise retardations in the roughened surface of the scattering film were 5 nm and 47 nm respectively, and a tacky layer was provided on the smooth surface of the scattering film.

Comparative Example 8

A reflection-transmission double type liquid-crystal display device was obtained by using an optical film in the manner similar to that in Example 7, except that the optical film was formed so that the inclination angle of each of optical path changing slopes was about 30 degrees, and the average in-plane and thicknesswise retardations of the optical film were 5 nm and 44 nm respectively.

Comparative Example 9

A reflection-transmission double type liquid-crystal display device was obtained by using an optical film in the manner similar to that in Example 7, except that the TAC film was replaced by a biaxially drawn polyester film, and the average in-plane and thicknesswise retardations of the optical film were 2,150 nm and 5,820 nm respectively.

Comparative Example 9

A reflection-transmission double type liquid-crystal display device was obtained in the following manner. A cathode-ray tube was disposed on one of side surfaces of a light pipe which had an embossed rough surface on the back side (opposite to the visual side) and which was 1.2 mm thick. The cathode-ray tube was enclosed by a reflector constituted by a silver-vapor-deposited reflection sheet. The opposite end portions of the reflector were bonded with the upper and lower surfaces of the light pipe. The light pipe obtained thus was disposed on a reflection sheet made of a silver-vapor-deposited polyester film, and a TN liquid-crystal panel in the manner similar to that in Example 7 was disposed on the light pipe.

Evaluation Test 2

Frontal luminance in the center portion of the reflection-transmission double type liquid-crystal display device obtained in each of Examples 7 and 8 and Comparative Examples 6 to 9 was measured by a luminance meter (BM-7 made by TOPCON Corp.) in a transmission mode where the cathode-ray tube was switched on in the condition that no voltage was applied to the liquid-crystal display panel. In addition, frontal luminance was also measured in a white state in a reflection mode where the cathode-ray tube was switched off while external light by using ring-like illumination was made incident at an angle of 15 degrees.

Results of the measurement were shown in the following Table 2.

|  | Frontal luminance (cd/m²) | | | | | |
| --- | --- | --- | --- | --- | --- | --- |
|  | Ex.7 | Ex.8 | Comp.6 | Comp.7 | Comp.8 | Comp.9 |
| Transmission mode | 22 | 24 | 6 | 8 | 18 | 35 |
| Reflection mode | 416 | 432 | 365 | 388 | 124 | 360 |

It is apparent from the Table 2 that frontal luminance in each of Examples 7 and 8 superior to that in any one of Comparative Examples 6 to 8 was attained in both the transmission mode and the reflection mode. Light was made to exit in a direction reverse to the light source in the transmission mode in Comparative Examples 6 and 7, so that the exit light for frontal luminance was so insufficient as to be difficult to contribute to display. Particularly in Comparative Example 6, the exit light was insufficient in any direction. On the other hand, in Comparative Example 8, a stripe-like color shift appeared in a perspective direction so that uniform display could not be obtained.

Further, in the transmission mode, Examples 7 and 8 had excellent display quality without any problem in viewing in the condition that a voltage was applied to the liquid-crystal display panel. On the contrary, in Comparative Examples 6 and 7, display was too dark to view easily. In Comparative Example 8, a color shift appeared in perspective view due to slight coloring so that display was not easy to view. In addition, in Example 7, easy viewing in the case where the light diffusing film was removed was inferior to that in the case where the light diffusing film was provided. However, frontal luminance in both cases stood comparison with each other.

On the other hand, also in the reflection mode, display in Examples 7 and 8 and Comparative Examples 6 and 7 had bright and excellent display with no image disorder or the like in the condition that a voltage was applied to the liquid-crystal display panel. On the contrary, in Comparative Example 8, coloring was present in display and a stripe-like color shift appeared in perspective view. In Comparative Example 9, a parallax appeared in an image due to the thickness of the light pipe so that the image was not easy to view. Incidentally, in the method of using the side-lighting type light pipe in Comparative Example 9, increase in thickness of the display device appeared conspicuously due to the light pipe so that reduction in thickness of the display device was difficult to be attained.

It is proved from the above description, where bright display was attained in both the reflection mode and the transmission mode in Examples 7 and 8. Accordingly, according to the present invention, it is possible to form a transmission-type or reflection-transmission double type liquid-crystal display device which is prevented from increasing in volume and weight caused by a light pipe, and which is made small in thickness and light in weight by a film system, and which is good in display quality.

EXAMPLE 9

A mold processed into a predetermined shape in advance was filled with acrylic ultraviolet-curing resin (GRANDIC RC-8720, made by DAINIPPON INK & CHEMICALS Inc.) by dropping with a dropper. A non-drawn polycarbonate (PC) film 60 μm thick was disposed quietly on the resin, and made to adhere closely to the resin by a rubber roller so as to eliminate excessive resin and bubbles. The PC film with the resin was irradiated with ultraviolet rays at 300 mJ/cm$^2$ by a metal halide lamp so as to be cured. The resin-including PC film cured thus was stripped off from the mold and cut into a predetermined size. A repetitive structure layer of a plurality of optical path changing means having a refractive index of 1.522 was formed on one surface of the PC film. Then, the PC film was stripped off to obtain a transparent film. A rubber tacky layer with a refractive index of 1.515 provided on a strip sheet was provided on the other surface of the transparent film which did not have the plurality of optical path changing means.

The optical film was 50 mm width and 50 mm deep, and had continuous grooves at intervals of a pitch of 210 μm. The ridgelines of the grooves were parallel with the width direction of the optical film. An inclination angle and a width of each of optical path changing slopes A1 of the grooves were in a range of from 42.5 to 43 degrees and in a range of from 10 to 16 μm, respectively. An inclination angle of each of gentle slopes A3 (flat surfaces) was in a range of from 1.8 to 3.5 degrees, and the difference in inclination angle between adjacent ones of gentle slopes A3 was not larger than 0.1 degrees, and the projected area of the gentle slopes on a plane of the optical film was not smaller than 12 times as large as that of the optical path changing slopes A1 on the film plane (FIG. 1C). Next, the optical film was stripped off from the strip sheet, and bonded onto the back side (opposite to the visual side) of a liquid-crystal display panel through the tacky layer of the optical film so as to obtain a liquid-crystal display device.

The liquid-crystal display panel was a polymer dispersion type obtained as follows. A non-alkali glass plate having a refractive index of 1.51 by abrasive finishing was subjected to plasma treatment in an argon atmosphere. Transparent electrodes of indium-tin oxide (ITO) thin films were formed on the non-alkali glass plate by sputtering. A pair of cell substrates obtained thus by the transparent electrodes were disposed with a gap through gap adjusters made of spherical glass beads and fixed with sealers, so that the transparent electrodes were opposite to each other. Then, a uniform mixture liquid of 10 parts (parts by weight, this rule was also applied hereinafter) of trimethyl propane triacrylate, 10 parts of 2-hydroxyethyl acrylate, 25 parts of acrylic oligomer (M-1200, made by TOAGOSEI Co., Ltd.), 0.5 parts of photo-curing starter (Darocure 1173, made by MERCK & Co., Inc.), and 50 parts of liquid crystal (E7, made by BDH INDUSTRIES Ltd.) was injected into the gap between the cell substrates, and irradiated with ultraviolet rays from the outside of the cell so as to form a liquid-crystal cell. An anti-reflection film was further bonded onto the visual side of the liquid-crystal cell through a rubber tacky layer produced in the above-mentioned manner so that the anti-reflection layer was positioned outside. Thus, a liquid-crystal display panel of the polymer dispersion type was obtained. Incidentally, the transparent electrode on each cell substrate was divided into two in advance.

Next, a cathode-ray tube was disposed on one of side surfaces of the liquid-crystal display panel, and enclosed by a reflector made of a silver-vapor-deposited reflective sheet. The opposite end portions of the reflector were bonded to the upper and lower surfaces of the panel so that the cathode-ray tube was fixed. Thus, a transmission type liquid-crystal display device in which the illuminator was disposed was formed. The liquid-crystal display device was disposed on a blackboard. Incidentally, the optical film was disposed so that the optical path changing slopes face and are parallel to the cathode-ray tube.

EXAMPLE 10

An optical film was obtained in the manner similar to that in Example 9, except that the rubber tacky layer had a refractive index of 1.505. A transmission type liquid-crystal display device was obtained by using the thus obtained optical film.

EXAMPLE 11

An optical film was obtained in the manner similar to that in Example 9, except that the rubber tacky layer was replaced by an adhesive layer made of an acrylic ultraviolet-curing adhesive agent and having a refractive index of 1.52. A transmission type liquid-crystal display device was obtained by using the thus obtained optical film. Incidentally, after brought in close contact with the liquid-crystal display panel through the adhesive layer, the optical film was irradiated with ultraviolet rays by a metal halide lamp so that the adhesive layer was cured to bond the optical film to the panel.

Comparative Example 10

A transmission type liquid-crystal display device was obtained in the manner similar to that in Example 9, except that the plurality of optical film having the optical path changing means was replaced by a scattering film. The scattering film was formed with a mold which had a roughened surface by sandblasting, so as to have substantially random prismatic structures with a maximum inclination angle of about 15 degrees measured by Talysurf made by TAYLOR-HOBSON Ltd.

Comparative Example 11

An optical film was obtained in the manner similar to that in Example 9, except that the rubber tacky layer was replaced by an acrylic tacky layer with a refractive index of 1.47. A transmission type liquid-crystal display device was obtained by using the thus obtained optical film.

Evaluation Test 3

Frontal luminance in the center portion of the transmission type liquid-crystal display device obtained in each of Examples 9 to 11 and Comparative Examples 10 and 11 was measured by a luminance meter (BM-7 made by TOPCON Corp.), which was located at a distance of 10 mm, 25 mm or 40 mm from the cathode-ray-tube-disposing side surface, in the condition that the cathode-ray tube was switched on while the liquid-crystal cell was supplied with no voltage.

Results of the aforementioned measurement were shown in the following Table 3.

| Distance | Frontal luminance (cd/m²) | | |
| --- | --- | --- | --- |
|  | 10 mm | 25 mm | 40 mm |
| Example 9 | 23 | 24 | 23 |
| Example 10 | 25 | 22 | 19 |
| Example 11 | 24 | 25 | 25 |
| Comparative Example 10 | 2 | 4 | 5 |
| Comparative Example 11 | 24 | 16 | 11 |

It is apparent from the Table 3 that frontal luminance in each of Examples 9 to 11 superior to that in any one of Comparative Examples 10 and 11 was attained and uniformity of luminance was also excellent. In addition, luminance and uniformity of luminance were higher in the order of Comparative Example 11, Example 10, Example 9 and Example 11. The results correspond to the value of the refractive index of each adhesive means. Although variation of luminance was rarely recognized also in real viewing in Examples 9 to 11, the display became darker in a position farther from the light source in Comparative Example 11, and the difference in luminance was visually recognized distinctly. Further, in Comparative Example 10, light was made to exit in a direction reverse to the light source at a large angle so that the exit light hardly contributed to display. Therefore, the frontal luminance ran short to make the display dark. It is proved from the above description that display which was bright and excellent in uniformity of brightness was attained in Examples 9 to 11. Accordingly, according to the present invention, it is possible to form a transmission type or reflection-transmission double type liquid-crystal display device which is prevented from increasing in volume and weight because of a light pipe, and hence made small in thickness and light in weight by a film system, and which is good in display quality.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:
    a transparent film comprising at least one layer forming at least one surface of said transparent film;
    an adhesive layer provided on said one surface of said transparent film, said adhesive layer having a refractive index different by 0.1 or less from a refractive index of said at least one layer of said transparent film; and
    a repetitive prismatic structure provided on the other surface of said transparent film, said repetitive prismatic structure having optical path changing slopes at least a portion of which are aligned in a substantially constant direction at an inclination angle in a range of from 35 to 48 degrees with respect to a plane of said transparent film,
    wherein a projected area, onto said film plane, of flat surfaces each having an inclination angle of not larger than 5 degrees with respect to said film plane is not smaller than 10 times as large as a projected area, onto said film plane, of the slopes each having an inclination angle of not smaller than 35 degrees with respect to said film plane.

2. An optical film according to claim 1, wherein said optical path changing slopes are constituted by at least two kinds of slopes in which one kind of slopes aligned in a substantially constant direction serve as a reference while the other kind of slopes are aligned substantially in a direction which is opposite to said one kind of slopes; and wherein said adhesive layer is covered with a strip sheet.

3. An optical film according to claim 1, wherein said inclination angle of each of said optical path changing slopes with respect to said film plane is in a range of from 38 to 45 degrees.

4. An optical film according to claim 1, wherein said optical path changing slopes are formed based on a structure of grooves each shaped substantially like an isosceles triangle or any other triangle in section.

5. An optical film according to claim 1, wherein said optical path changing slopes are formed based on a structure of grooves or protrusions each shaped substantially like a tetragon or a pentagon in section.

6. An optical film according to claim 1, wherein said prismatic structure includes optical path changing slopes each having an inclination angle in a range of from 38 to 45 degrees with respect to said film plane, and flat surfaces each having an inclination angle of not larger than 5 degrees with respect to said film plane; wherein a projected width of each of said flat surfaces onto said film plane is not smaller than 10 times as large as a projected width of each of said optical path changing slopes onto said film plane; and wherein said prismatic structure is formed into continuous grooves each of which is shaped substantially like a triangle in section and each of which is extended from one end of said film to the other end thereof.

7. An optical film according to claim 1, wherein said prismatic structure having optical path changing slopes is formed into discontinuous grooves each shaped substantially like a polygon in section; wherein a length of each of said discontinuous grooves is not smaller than five times as large as a depth of each of said discontinuous grooves; wherein said optical path changing slopes are formed in a direction of the length of said grooves at an inclination angle in a range of from 38 to 45 degrees with respect to said film plane; and wherein a projected area of said discontinuous grooves onto an area of said film plane is not larger than 10%.

8. An optical film according to claim 7, wherein said discontinuous grooves each are shaped substantially like a triangle in section.

9. An optical film according to claim 7, wherein said discontinuous grooves each are shaped substantially like a tetragon or pentagon in section.

10. An optical film according to claim 1, wherein said transparent film is not thicker than 300 μm.

11. An optical film according to claim 1, further comprising a reflection layer disposed closely on a surface of said transparent film on which said prismatic structure having said optical path changing slopes is formed.

12. An optical film according to claim 1, wherein ridge-lines of said optical path changing slopes are parallel to or inclined within an angle range of ±30 degrees with respect to one side of said transparent film.

13. An optical film according to claim 1, wherein said adhesive layer is of a light diffusion type.

* * * * *